US012545668B2

United States Patent
Nishimura et al.

(10) Patent No.: US 12,545,668 B2
(45) Date of Patent: Feb. 10, 2026

(54) CYCLIC AMINE DERIVATIVE AS AGENT FOR PROMOTING ADVILLIN FUNCTION, AND NOVEL CYCLIC AMINE DERIVATIVE AND PHARMACEUTICAL USE THEREOF

(71) Applicant: Toray Industries, Inc., Tokyo (JP)

(72) Inventors: Kazumi Nishimura, Kamakura (JP); Koji Takeo, Kamakura (JP); Kohji Shimoda, Kamakura (JP); Tatsuya Nishi, Kamakura (JP)

(73) Assignee: Toray Industries, Inc., Tokyo (JP)

( * ) Notice: Subject to any disclaimer, the term of this patent is extended or adjusted under 35 U.S.C. 154(b) by 901 days.

(21) Appl. No.: 17/417,827

(22) PCT Filed: Dec. 26, 2019

(86) PCT No.: PCT/JP2019/051104
§ 371 (c)(1),
(2) Date: Jun. 24, 2021

(87) PCT Pub. No.: WO2020/138281
PCT Pub. Date: Jul. 2, 2020

(65) Prior Publication Data
US 2022/0081431 A1    Mar. 17, 2022

(30) Foreign Application Priority Data
Dec. 26, 2018   (JP) ................. 2018-243042

(51) Int. Cl.
*C07D 413/14*    (2006.01)
*A61P 25/00*     (2006.01)
*C07D 401/06*    (2006.01)

(52) U.S. Cl.
CPC .......... *C07D 413/14* (2013.01); *A61P 25/00* (2018.01); *C07D 401/06* (2013.01)

(58) Field of Classification Search
CPC ..................... C07D 413/14; C07D 401/06
See application file for complete search history.

(56) References Cited

U.S. PATENT DOCUMENTS

| | | | | |
|---|---|---|---|---|
| 10,173,999 B2 * | 1/2019 | Arai | ............ | A61P 21/00 |
| 11,510,914 B2 * | 11/2022 | Serizawa | ............ | A61P 25/00 |
| 2009/0012074 A1 | 1/2009 | Drescher et al. | | |
| 2011/0201650 A1 | 8/2011 | Morita et al. | | |
| 2018/0065950 A1 | 3/2018 | Arai et al. | | |
| 2020/0030293 A1 | 1/2020 | Hara et al. | | |
| 2021/0023068 A1 | 1/2021 | Serizawa et al. | | |

FOREIGN PATENT DOCUMENTS

| | | | |
|---|---|---|---|
| CA | 3035161 A1 | 3/2018 | |
| RU | 2442781 C2 | 2/2012 | |
| RU | 2478621 C2 | 4/2013 | |
| WO | 2013/147160 A1 | 10/2013 | |
| WO | WO-2016136944 A1 * | 9/2016 | ......... A61K 31/4178 |
| WO | 2018/181860 | 10/2018 | |
| WO | 2019/189781 | 10/2019 | |
| WO | WO-2019189781 A1 * | 10/2019 | ......... A61K 31/4178 |

OTHER PUBLICATIONS

Chuang et al., "Involvement of advillin in somatosensory neuron subtype-specific axon regeneration and neuropathic pain," Proceedings of the National Academy of Sciences, vol. 115, 2018, pp. 1-10 (Year: 2018).*
Caro et al., "The Role and Importance of Small Fiber Neuropathy in Fibromyalgia Pain", 2015, Current Pain and Headache Reports, 19, pp. 1-7 (Year: 2015).*
Garcia-Martin et al., "Fibromyalgia Is Correlated with Retinal Nerve Fiber Layer Thinning", 2016, PLOS One, 11, pp. 1-15 (Year: 2016).*
LoPachin et al., "Mechanism of Calcium Entry during Axon Injury and Degeneration", 1996, Toxicology and Applied Pharmacology, 143, pp. 233-244 (Year: 1996).*
Stoll et al., "Nerve Injury, Axonal Degeneration and Neural Regeneration: Basic Insights", 1999, Brain Pathology, 9, pp. 313-325 (Year: 1999).*
Office Action dated Feb. 24, 2022, of counterpart Russian Patent Application No. 2021121698, along with an English translation.
G. Dyson et al., "Chemistry of Synthetic Drugs," MIR Publishing House, pp. 12-19, Moscow 1964, English Translation.
V.G. Belikov, "Pharmaceutical Chemistry," Study Guide, Fourth Edition, MEDpress-inform, pp. 27-29, 2007, English Translation.
I.I. Krasnyuk et al., "Pharmaceutical Technology: Technology of Dosage Forms: Textbook for University Students," Academy, p. 41, 2006, English Translation.
V.G. Belikov, "Pharmaceutical Chemistry," High School, pp. 43-47, 1993, English Translation.

(Continued)

*Primary Examiner* — Brenda L Coleman
*Assistant Examiner* — Madeline E Braun
(74) *Attorney, Agent, or Firm* — DLA Piper LLP (US)

(57) ABSTRACT

An agent for promoting advillin function, the agent including a low molecular weight compound, and is useful for treatment of axonal injury. In some instances, the agent for promoting advillin function, includes a cyclic amine derivative typically represented by the following chemical formula, or a pharmacologically acceptable salt thereof as an active ingredient.

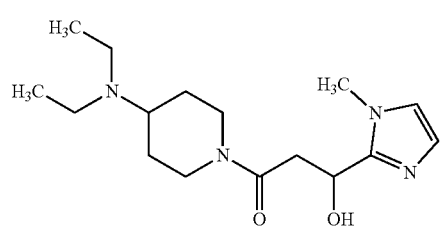

[Formula 1]

16 Claims, 4 Drawing Sheets

(56) References Cited

OTHER PUBLICATIONS

P.V. Sergeev, "Brief Course in Molecular Biology," Ministry of Health of the RSFSR, $2^{nd}$ Moscow State Medical Institute, p. 10, 1975, English Translation.

L.E. Cholodov et al., "Clinical Pharmokinetics," Medicine, pp. 83-98, 134-138, 160, 378-380, 1985, English Translation.

Sun Ho Kim et al., "An experimental model for peripheral neuropathy produced by segmental spinal nerve ligation in the rat," Pain, vol. 50, 1992, pp. 355-363.

Kent Carlson et al., "Organophosphorus Compounds Alter Intracellular F-Actin Content in SH-SY5Y Human Neuroblastoma Cells," NeuroToxicology, vol. 22, 2001, pp. 819-827.

Samantha J. Ravenall et al., "A peripheral nervous system actin-binding protein regulates neurite outgrowth," European Journal of Neuroscience, vol. 15, 2002, pp. 281-290.

Kaori Nishiwaki et al., "Peripheral Nerve Regeneration after Injury and Rehabilitation Managements," The Japanese Journal of Rehabilitation Medicine, vol. 39, No. 5, 2002, pp. 257-266 with English translation.

Hiroshi Hasegawa et al., "Analyzing Somatosensory Axon Projections with the Sensory Neuron-Specific Advillin Gene," The Journal of Neuroscience, vol. 27, Dec. 26, 2007, pp. 14404-14414.

Fuminori Kanaya, "Treating Peripheral Nerve Injuries," The Japanese Journal of Rehabilitation Medicine, vol. 51, No. 1, 2014, pp. 52-60.

Sokho Kim et al., "Actin cytoskeletal rearrangement and dysfunction due to activation of the receptor for advanced glycation end products is inhibited by thymosin beta4," The Journal of Physiology, vol. 593, No. 8, 2015, pp. 1873-1886.

Jia Rao et al., "Advillin acts upstream of phospholipase $C\epsilon 1$ in steroid-resistant nephrotic syndrome," The Journal of Clinical Investigation, vol. 127, 2017, pp. 4257-4269.

Yuichi Aono et al., "Sulindac sulfone inhibits the mTORC1 pathway in colon cancer cells by directly targeting voltage-dependent anion channel 1 and 2," Biochemical and Biophysical Research Communications, vol. 505, 2018, pp. 1203-1210.

Oriane Blanquie et al., "Cytoskeleton dynamics in axon regeneration," Current Opinion in Neurobiology, vol. 51, 2018, pp. 60-69.

Yang Yang et al., Nrf2 inhibits oxaliplatin-induced peripheral neuropathy via protection of mitrochondrial function, Free Radical Biology and Medicine, vol. 120, 2018, pp. 13-24.

Yu-Chia Chuang et al., "Involvement of advillin in somatosensory neuron subtype-specific axon regeneration and neuropathic pain," Proceedings of the National Academy of Sciences, vol. 115, 2018, pp. E8557-E8566.

First Office Action dated Jul. 30, 2023, of counterpart Chinese Patent Application No. 201980086201.9, along with an English machine translation.

Office Action dated May 31, 2023, of counterpart Taiwanese Patent Application No. 108147878, along with an English machine translation.

I.I. Krasnyuk et al., "Pharmaceutical Technology: Technology of Dosage Forms: Textbook for University Students," Academy, pp. 6 and 41, 2006, English Translation.

L.E. Cholodov et al., "Clinical Pharmacokinetics," Medicine, pp. 83-98, 134-138, 160, 378-380, 1985, English Translation.

E.G. Tsublova et al., "Dependence of the Benzothiazole Derivatives of an Actoprotective Effect from the Type of Substituent in the Heterocycle and the Type of Acidic Residue," 4(123), Issue 17/1, pp. 245-249, 2012, Abstract only in English.

Extended European Search Report dated Aug. 9, 2022, of counterpart European Patent Application No. 19902158.5.

Official Action dated Sep. 7, 2022, of counterpart Russian Patent Application No. 2021121698, along with an English translation.

Examination Report dated Aug. 16, 2024, of counterpart Australian Patent Application No. 2019414251.

Office Action dated Nov. 28, 2024, from counterpart Canadian Application No. 3,123,833.

Office Action dated Feb. 25, 2025, from counterpart European Patent Application No. 19 902 158.5.

Nawaz, Schanila et al., "Actin Filament Turnover Drives Leading Edge Growth during Myelin Sheath Formation in the Central Nervous System," Developmental Cell, Cell Press, US, Jul. 27, 2015, vol. 34, No. 2, pp. 139-151.

\* cited by examiner

[Fig. 1]
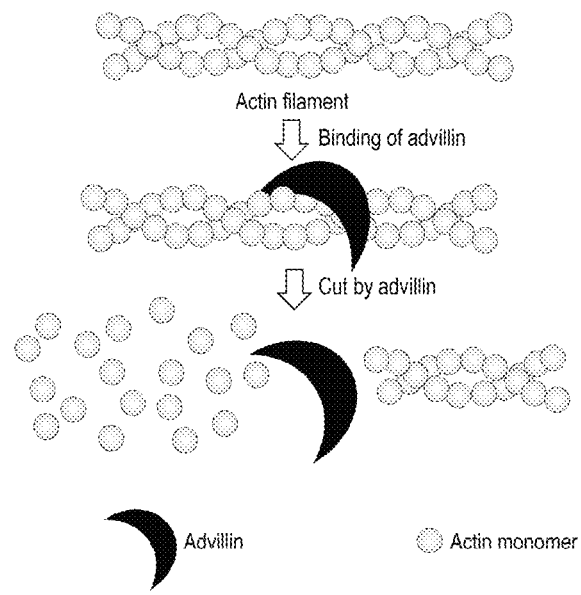
[Fig. 2]
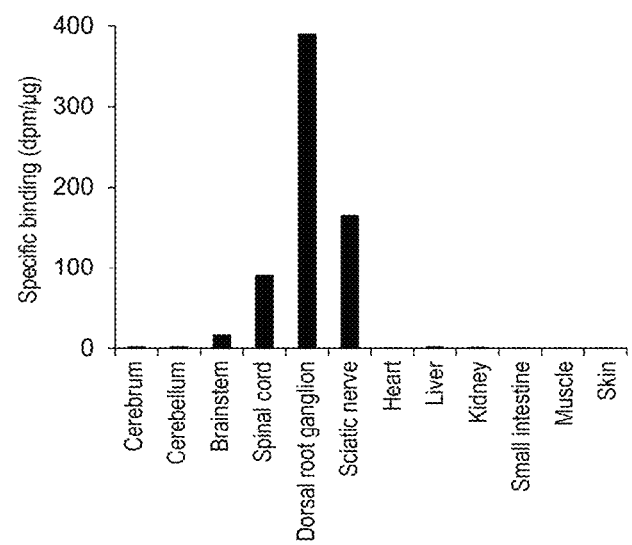

[Fig. 3]
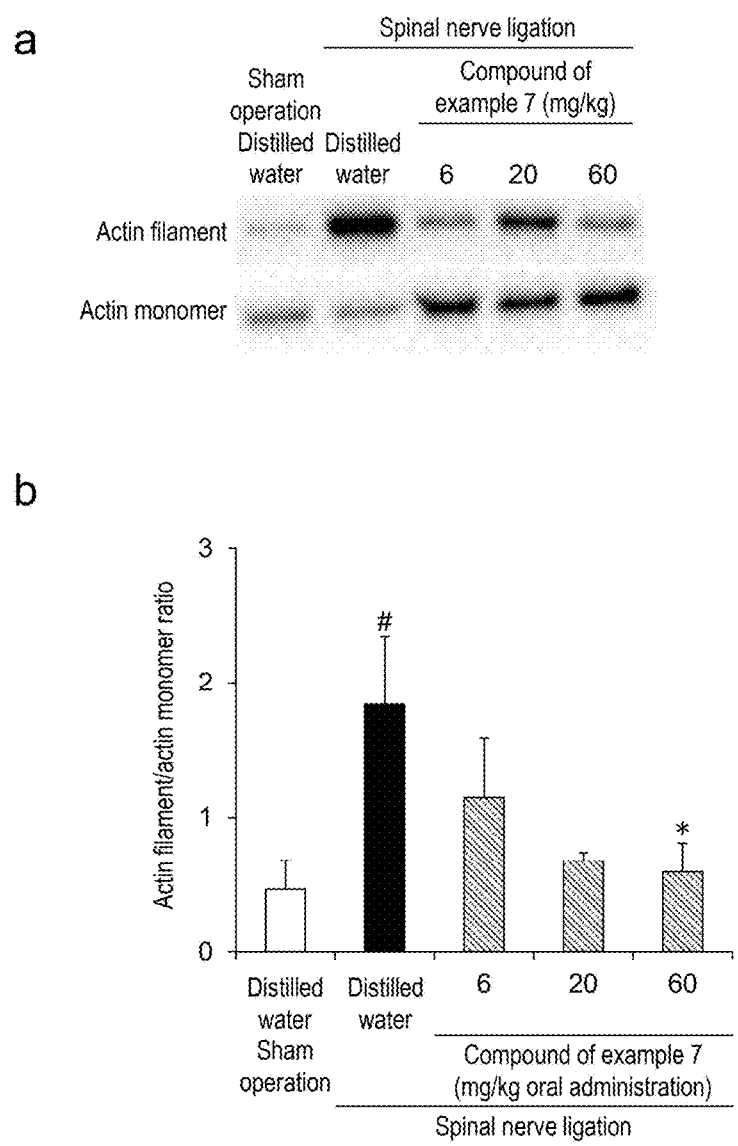

[Fig. 4]
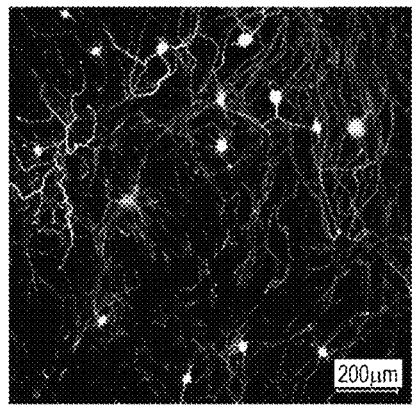
Treatment with distilled water
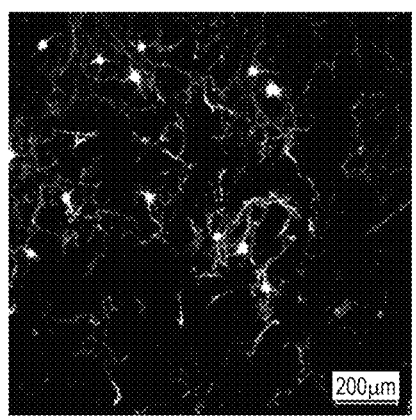
Treatment with oxaliplatin alone
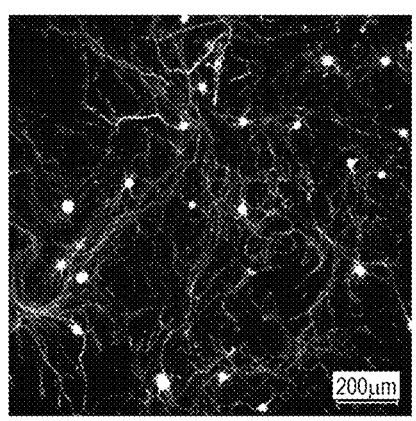
Treatment with oxaliplatin + 100 μm compound of example 7

[Fig. 5]
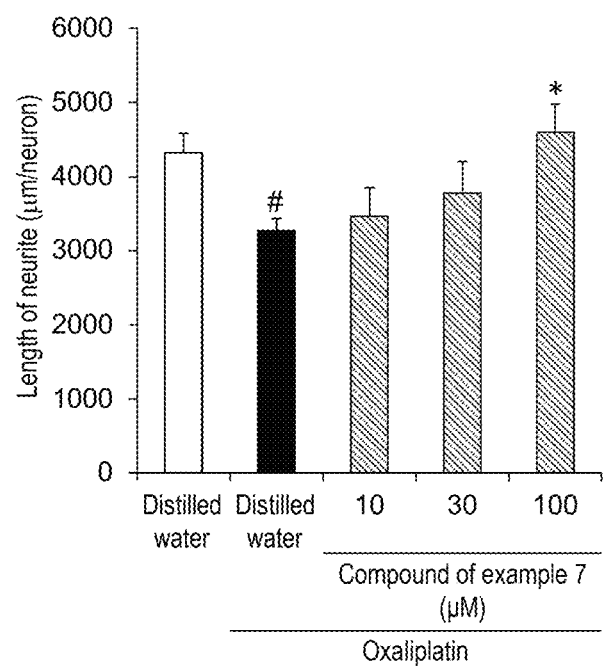

CYCLIC AMINE DERIVATIVE AS AGENT FOR PROMOTING ADVILLIN FUNCTION, AND NOVEL CYCLIC AMINE DERIVATIVE AND PHARMACEUTICAL USE THEREOF

TECHNICAL FIELD

This disclosure relates to a cyclic amine derivative as an agent for promoting advillin function, and a novel cyclic amine derivative and a pharmaceutical use thereof.

BACKGROUND

Advillin mainly expresses in peripheral nerves, and plays a significant role in axon extension (Ravenall et al., European Journal of Neuroscience, 2002, Vol. 15, pp 281-290 and Hasegawa et al., The Journal of Neuroscience, 2007, Vol. 27, pp 14404-14414). An advillin-deficient mouse is found to have dysfunction of axon extension in regeneration of neural circuit, and have shorter axon (Hasegawa et al.). If axonal injury is induced in an advillin-deficient mouse by nerve ligation, an anti-cancer treatment or the like, symptoms related to the axonal injury are aggravated compared to a normal mouse (Hasegawa et al. and Chuang et al., Proceedings of the National Academy of Sciences of the United States of America, 2018, Vol. 115, pp E8557-E8566). On the other hand, in neurons in which advillin is overexpressed, the number and the length of neurites including axons are increased (Chuang et al.). In other words, it is known that advillin has an effect of promoting axon extension in nerve regeneration.

To extend an axon, it is necessary to normally regulate actin monomer polymerization and actin filament depolymerization (hereinafter the actin filament turnover) in the growth cone at the tip of the axon (Blanquie et al., Current Opinion in Neurobiology, 2018, Vol. 51, pp 60-69). It is known that advillin is present in the growth cone at the tip of an axon (Chuang et al.). It is also known that advillin has a function, as an actin-binding protein, to regulate actin filament turnover (Rao et al., The Journal of Clinical Investigation, 2017, Vol. 127, pp 4257-4269).

Axonal injury of a peripheral nerve is also designated as a peripheral nerve injury, is caused by a surgical operation, a toxic substance, blood circulation disorder, an external wound caused by traffic accident or the like, radiation therapy or the like, and causes motor paralysis, anesthesia, or failure of autonomic nerves or the like. Axonal regeneration is known to occur after axonal injury of a peripheral nerve, but incomplete functional recovery including abnormality occurs in many instances. One of causes is said to be as follows: Actual axonal regeneration takes time, during which tissues around the axon and a target tissue to be joined to an end of the axon are degenerated. Therefore, the end of the axon cannot be accurately re-joined to the target tissue or target cell. Hence, effective and normal reinnervation cannot be performed. Inaccurate rejoining occurs not only between a nerve and a target tissue such as a muscle tissue but also between sensory nerves and between motor nerves, and results in abnormal perception when occurring between sensory nerves, and involuntary abnormal movement when occurring between motor nerves (Nishiwaki et al., The Japanese Journal of Rehabilitation Medicine, 2002, Vol. 39, pp 257-266). In particular, neurotmesis in which an axon and a nerve sheath are ruptured cannot be expected to be spontaneously recovered, and there is no effective therapeutic agent. Therefore, a surgical treatment such as nerve repair or function reconstructive surgery is employed, but such a treatment is disadvantageous due to a large burden of a patient (Kanaya, The Japanese Journal of Rehabilitation Medicine, 2014, Vol. 51, pp 52-60). Accordingly, there is a desire for an effective therapeutic agent for promoting axon extension to be used to treat and prevent incomplete functional recovery including abnormality after axonal injury of a peripheral nerve.

WO 2016/136944 and WO 2018/181860 disclose that cyclic amine derivatives have analgesic action, and can treat or prevent peripheral neuropathies, but do not disclose an effect of promoting advillin function and an effect of treating axonal injury. There are no known compounds that promote the advillin function.

Accordingly, it could be helpful to provide an agent for promoting advillin function that comprises a low molecular weight compound, and is useful for treatment of axonal injury.

SUMMARY

We found that a cyclic amine derivative or a pharmacologically acceptable salt thereof has an effect of promoting advillin function.

We thus provide an agent for promoting advillin function, comprising a cyclic amine derivative represented by general formula (I) or a pharmacologically acceptable salt thereof as an active ingredient:

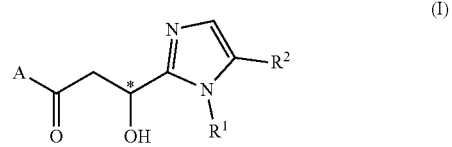

wherein carbon marked with * represents asymmetric carbon, and A represents a group represented by general formula (IIa) or (IIb):

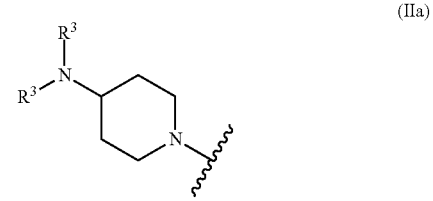

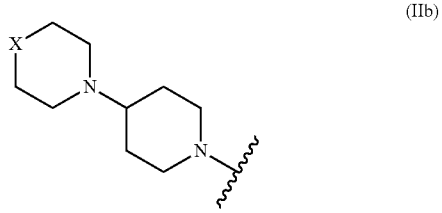

wherein $R^1$ represents a methyl group, a n-propyl group, an isopropyl group, a 2-methoxyethyl group, a 2-ethoxyethyl group, a difluoromethyl group, or a 3,3,3-trifluoropropyl group, $R^2$ represents a hydrogen atom, a fluorine atom, or a chlorine atom, each $R^3$ independently represents a methyl group or an ethyl group, and X represents —O— or —N($R^3$)—.

In the above-described cyclic amine derivative, it is preferable that A is the group represented by general formula (IIa), in which $R^1$ is more preferably a methyl group, a n-propyl group, an isopropyl group, a 2-methoxyethyl group, or a 3,3,3-trifluoropropyl group.

In the above-described cyclic amine derivative, it is preferable that A is the group represented by general formula (IIb), in which X is more preferably —N($R^3$), and $R^1$ is further preferably a methyl group, a n-propyl group, an isopropyl group, a 2-methoxyethyl group, or a 3,3,3-trifluoropropyl group.

In the above-described cyclic amine derivative, $R^2$ is more preferably a hydrogen atom or a chlorine atom.

In the above-described cyclic amine derivative, the stereochemical configuration of the asymmetric carbon marked with * is more preferably S.

The effect of promoting advillin function can be further enhanced by defining as mentioned above.

We provide an agent for promoting advillin function, for promoting advillin function by binding to advillin and/or an advillin complex, comprising a cyclic amine derivative represented by general formula (I) or a pharmacologically acceptable salt thereof as an active ingredient.

We also provide an agent for promoting advillin function, for improving abnormality in regulation of actin filament turnover, comprising a cyclic amine derivative represented by general formula (I) or a pharmacologically acceptable salt thereof as an active ingredient.

We also provide an agent for promoting advillin function, for promoting axon extension, comprising a cyclic amine derivative represented by general formula (I) or a pharmacologically acceptable salt thereof as an active ingredient.

We further provide an agent for promoting advillin function, for improving abnormality in regulation of actin filament turnover and promoting axon extension by binding to advillin and/or an advillin complex, comprising a cyclic amine derivative represented by general formula (I) or a pharmacologically acceptable salt thereof as an active ingredient.

We also provide an agent for promoting advillin function, which is a therapeutic agent for axonal injury, comprising a cyclic amine derivative represented by general formula (I) or a pharmacologically acceptable salt thereof as an active ingredient.

We also provide a cyclic amine derivative that is one compound selected from the group consisting of 3-hydroxy-3-(1-methyl-1H-imidazol-2-yl)-1-(4-morpholinopiperidin-1-yl)propan-1-one, 1-(4-(dimethylamino)piperidin-1-yl)-3-(1-propyl-1H-imidazol-2-yl)-3-hydroxypropan-1-one, 1-(4-(dimethylamino)piperidin-1-yl)-3-(1-isopropyl-1H-imidazol-2-yl)-3-hydroxypropan-1-one, 3-(5-chloro-1-methyl-1H-imidazol-2-yl)-1-(4-(dimethylamino)piperidin-1-yl)-3-hydroxypropan-1-one, 1-(4-(dimethylamino)piperidin-1-yl)-3-(1-(2-methoxyethyl)-1H-imidazol-2-yl)-3-hydroxypropan-1-one and 1-(4-(dimethylamino)piperidin-1-yl)-3-(1-(3,3,3-trifluoropropyl)-1H-imidazol-2-yl)-3-hydroxypropan-1-one, or a pharmacologically acceptable salt thereof.

We also provide a medicine comprising, as an active ingredient, a cyclic amine derivative that is one compound selected from the group consisting of 3-hydroxy-3-(1-methyl-1H-imidazol-2-yl)-1-(4-morpholinopiperidin-1-yl)propan-1-one, 1-(4-(dimethylamino)piperidin-1-yl)-3-(1-propyl-1H-imidazol-2-yl)-3-hydroxypropan-1-one, 1-(4-(dimethylamino)piperidin-1-yl)-3-(1-isopropyl-1H-imidazol-2-yl)-3-hydroxypropan-1-one, 3-(5-chloro-1-methyl-1H-imidazol-2-yl)-1-(4-(dimethylamino)piperidin-1-yl)-3-hydroxypropan-1-one, 1-(4-(dimethylamino)piperidin-1-yl)-3-(1-(2-methoxyethyl)-1H-imidazol-2-yl)-3-hydroxypropan-1-one and 1-(4-(dimethylamino)piperidin-1-yl)-3-(1-(3,3,3-trifluoropropyl)-1H-imidazol-2-yl)-3-hydroxypropan-1-one, or a pharmacologically acceptable salt thereof.

We also provide a pharmaceutical composition for treating axonal injury, comprising a cyclic amine derivative represented by general formula (I) or a pharmacologically acceptable salt thereof, and a pharmacologically acceptable excipient or the like.

We also provide a cyclic amine derivative represented by general formula (I) or a pharmacologically acceptable salt thereof for use in treatment of axonal injury.

We also provide use of a cyclic amine derivative represented by general formula (I) or a pharmacologically acceptable salt thereof for treating axonal injury.

We also provide use of a cyclic amine derivative represented by general formula (I) or a pharmacologically acceptable salt thereof in production of a medicine for treating axonal injury.

We also provide a method of treating axonal injury, comprising administering a therapeutically effective amount of a cyclic amine derivative represented by general formula (I) or a pharmacologically acceptable salt thereof to a patient in need of treatment.

We also provide a method of treating axonal injury, comprising contacting an effective amount of a cyclic amine derivative represented by general formula (I) or a pharmacologically acceptable salt thereof with neurons.

We also provide a method of treating axonal injury, comprising administering an effective amount of a cyclic amine derivative represented by general formula (I) or a pharmacologically acceptable salt thereof to a subject in need thereof.

Examples of a cause of axonal injury include, but are not limited to: surgical operation, a toxic substance, blood circulation disorder, an external wound caused by traffic accident or the like, and radiation therapy.

We also provide a pharmaceutical composition for treating a disease related to axonal injury, comprising a cyclic amine derivative represented by general formula (I) or a pharmacologically acceptable salt thereof, and a pharmacologically acceptable excipient or the like.

We also provide a cyclic amine derivative represented by general formula (I) or a pharmacologically acceptable salt thereof for use in treatment of a disease related to axonal injury.

We also provide use of a cyclic amine derivative represented by general formula (I) or a pharmacologically acceptable salt thereof for treating a disease related to axonal injury.

We also provide use of a cyclic amine derivative represented by general formula (I) or a pharmacologically acceptable salt thereof in production of a medicine for treating a disease related to axonal injury.

We also provide a method of treating a disease related to axonal injury, comprising administering a therapeutically effective amount of a cyclic amine derivative represented by general formula (I) or a pharmacologically acceptable salt thereof to a patient in need of treatment.

We also provide a method of treating a disease related to axonal injury, comprising contacting an effective amount of a cyclic amine derivative represented by general formula (I) or a pharmacologically acceptable salt thereof with neurons.

We also provide a method of treating a disease related to axonal injury, comprising administering an effective amount of a cyclic amine derivative represented by general formula (I) or a pharmacologically acceptable salt thereof to a subject in need thereof.

We also provide a pharmaceutical composition for promoting advillin function, improving abnormality in regulation of actin filament turnover, or promoting axon extension, comprising a cyclic amine derivative represented by general formula (I) or a pharmacologically acceptable salt thereof, and a pharmacologically acceptable excipient or the like.

We also provide a cyclic amine derivative represented by general formula (I) or a pharmacologically acceptable salt thereof, for use in promoting advillin function, improving abnormality in regulation of actin filament turnover, or promoting axon extension.

We also provide use of a cyclic amine derivative represented by general formula (I) or a pharmacologically acceptable salt thereof, of promoting advillin function, improving abnormality in regulation of actin filament turnover, or promoting axon extension.

We also provide use of a cyclic amine derivative represented by general formula (I) or a pharmacologically acceptable salt thereof in production of a medicine of promoting advillin function, improving abnormality in regulation of actin filament turnover, or promoting axon extension.

We also provide a method of promoting advillin function, improving abnormality in regulation of actin filament turnover, or promoting axon extension, comprising administering a therapeutically effective amount of a cyclic amine derivative represented by general formula (I) or a pharmacologically acceptable salt thereof to a patient in need thereof.

We also provide a method of promoting advillin function, improving abnormality in regulation of actin filament turnover, or promoting axon extension, comprising contacting an effective amount of a cyclic amine derivative represented by general formula (I) or a pharmacologically acceptable salt thereof with neurons.

We also provide a method of promoting advillin function, improving abnormality in regulation of actin filament turnover, or promoting axon extension, comprising administering an effective amount of a cyclic amine derivative represented by general formula (I) or a pharmacologically acceptable salt thereof to a subject in need thereof.

Our cyclic amine derivative or a pharmacologically acceptable salt thereof can promote the function of advillin that is one of regulatory molecules for actin filament turnover, and can be used as a medicine for a disease related to axonal injury.

This description includes the description and/or drawings described in Japanese Patent Application No. 2018-243042, for which priority is claimed.

BRIEF DESCRIPTION OF THE DRAWINGS

FIG. 1 is a diagram illustrating advillin function against an actin filament.

FIG. 2 is a diagram illustrating specific bindings of a compound of Example 7 to membrane fractions prepared from various tissues of a rat.

FIGS. 3a and 3b are diagrams illustrating an effect of the compound of Example 7 of improving abnormality in regulation of actin filament turnover in a rat spinal nerve ligation model.

FIG. 4 is images illustrating an axon extension effect of the compound of Example 7 in primary cultured cells of rat dorsal root ganglion having axonal injury induced, as a change of a cell form.

FIG. 5 is a diagram illustrating the axon extension promoting effect of the compound of Example 7 in primary cultured cells of rat dorsal root ganglion having axonal injury induced.

DETAILED DESCRIPTION

The following terms used in the specification are, unless otherwise specified, defined as follows.

It is characterized in that the cyclic amine derivative according to one example is represented by general formula (I):

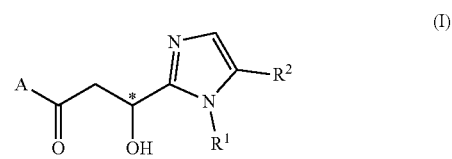

wherein carbon marked with * represents asymmetric carbon, and A represents a group represented by general formula (IIa) or (IIb):

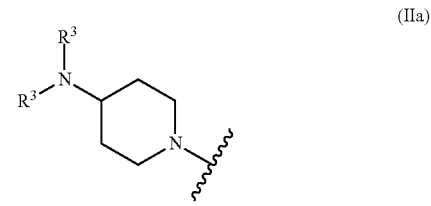

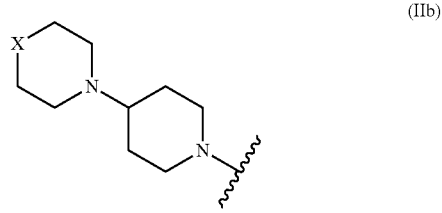

wherein $R^1$ represents a methyl group, a n-propyl group, an isopropyl group, a 2-methoxyethyl group, a 2-ethoxyethyl group, a difluoromethyl group, or a 3,3,3-trifluoropropyl group, $R^2$ represents a hydrogen atom, a fluorine atom, or a chlorine atom, each $R^3$ independently represents a methyl group or an ethyl group, and X represents —O— or —N($R^3$)—.

In the above-described cyclic amine derivative, it is preferable that A is the group represented by formula (IIa), in which $R^1$ is preferably a methyl group, a n-propyl group, an isopropyl group, a 2-methoxyethyl group, or a 3,3,3-trifluoropropyl group.

In the above-described cyclic amine derivative, it is preferable that A is the group represented by formula (IIb), in which X is preferably —N($R^3$), and $R^1$ is preferably a methyl group, a n-propyl group, an isopropyl group, a 2-methoxyethyl group, or a 3,3,3-trifluoropropyl group.

In the above-described cyclic amine derivative, $R^2$ is preferably a hydrogen atom or a chlorine atom.

In the above-described cyclic amine derivative, the stereochemical configuration of the asymmetric carbon marked with * is preferably S.

In one example of the cyclic amine derivative, A is a group represented by general formula (IIa), $R^1$ is a methyl group, a n-propyl group, an isopropyl group, a 2-methoxyethyl group, or a 3,3,3-trifluoropropyl group, $R^2$ is a hydrogen atom or a chlorine atom, and $R^3$ is a methyl group or an ethyl group. In this example, the stereochemical configuration of the asymmetric carbon marked with * is preferably S.

In one configuration, A is a group represented by general formula (IIb), X is —N($R^3$)—, $R^1$ is a methyl group, a n-propyl group, an isopropyl group, a 2-methoxyethyl group, or a 3,3,3-trifluoropropyl group, $R^2$ is a hydrogen atom or a chlorine atom, and $R^3$ is a methyl group or an ethyl group. The stereochemical configuration of the asymmetric carbon marked with * is preferably S.

In one configuration, A is a group represented by general formula (IIb), X is —O—, $R^1$ is a methyl group, a n-propyl group, an isopropyl group, a 2-methoxyethyl group, or a 3,3,3-trifluoropropyl group, $R^2$ is a hydrogen atom or a chlorine atom, and $R^3$ is a methyl group or an ethyl group. The stereochemical configuration of the asymmetric carbon marked with * is preferably S.

The cyclic amine derivative according to one configuration is one compound selected from the group consisting of 3-hydroxy-3-(1-methyl-1H-imidazol-2-yl)-1-(4-morpholinopiperidin-1-yl)propan-1-one, 1-(4-(dimethylamino)piperidin-1-yl)-3-(1-propyl-1H-imidazol-2-yl)-3-hydroxypropan-1-one, 1-(4-(dimethylamino)piperidin-1-yl)-3-(1-isopropyl-1H-imidazol-2-yl)-3-hydroxypropan-1-one, 3-(5-chloro-1-methyl-1H-imidazol-2-yl)-1-(4-(dimethylamino)piperidin-1-yl)-3-hydroxypropan-1-one, 1-(4-(dimethylamino)piperidin-1-yl)-3-(1-(2-methoxyethyl)-1H-imidazol-2-yl)-3-hydroxypropan-1-one and 1-(4-(dimethylamino)piperidin-1-yl)-3-(1-(3,3,3-trifluoropropyl)-1H-imidazol-2-yl)-3-hydroxypropan-1-one.

Specific examples of a compound preferable as a cyclic amine derivative represented by general formula (I) (hereinafter, a cyclic amine derivative (I)) will be shown in Tables 1 and 2, but this disclosure is not limited to the examples.

TABLE 1

Structural Formula

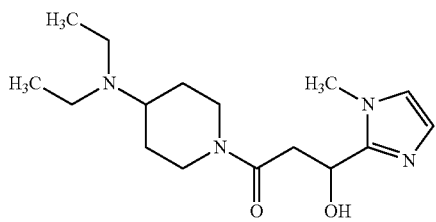 [SMILES: CCN(CC)C1CCN(C(=O)CC(O)c2nccn2C)CC1]

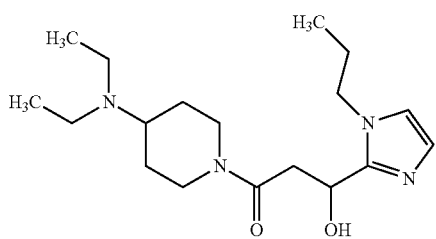 [SMILES: CCCn1ccnc1C(O)CC(=O)N1CCC(N(CC)CC)CC1]

TABLE 1-continued

Structural Formula

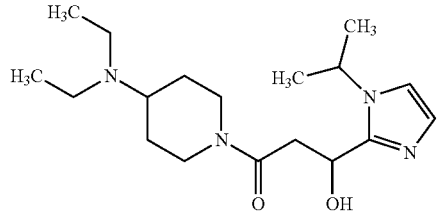 [SMILES: CCN(CC)C1CCN(C(=O)CC(O)c2nccn2C(C)C)CC1]

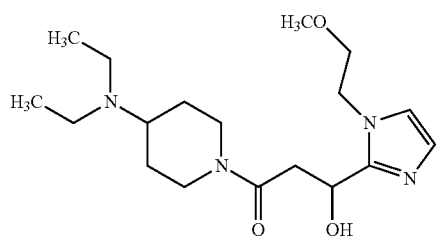 [SMILES: CCN(CC)C1CCN(C(=O)CC(O)c2nccn2CCOC)CC1]

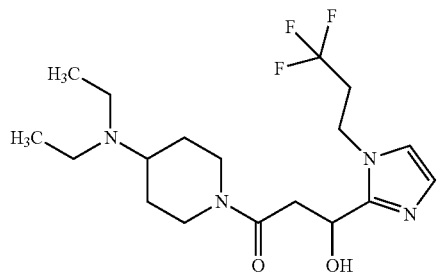 [SMILES: CCN(CC)C1CCN(C(=O)CC(O)c2nccn2CCC(F)(F)F)CC1]

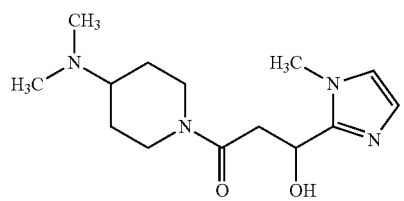 [SMILES: CN(C)C1CCN(C(=O)CC(O)c2nccn2C)CC1]

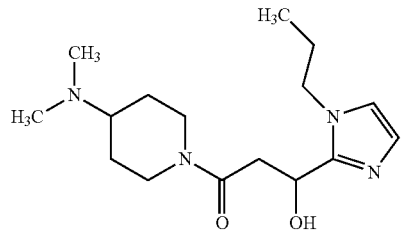 [SMILES: CCCn1ccnc1C(O)CC(=O)N1CCC(N(C)C)CC1]

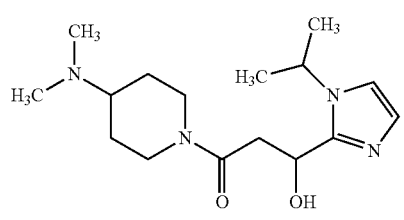 [SMILES: CC(C)n1ccnc1C(O)CC(=O)N1CCC(N(C)C)CC1]

TABLE 1-continued
Structural Formula
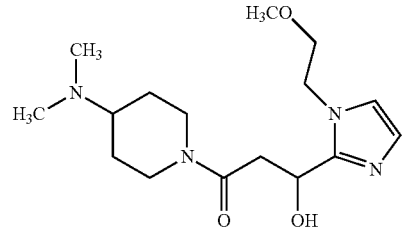 [SMILES: COCCn1ccnc1C(O)CC(=O)N1CCC(N(C)C)CC1]
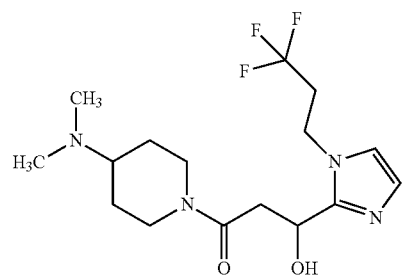 [SMILES: CN(C)C1CCN(C(=O)CC(O)c2nccn2CCC(F)(F)F)CC1]
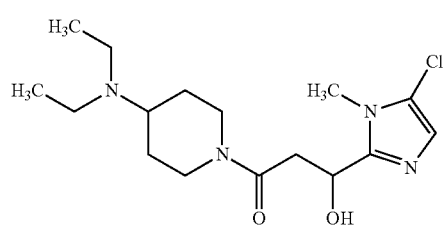 [SMILES: CCN(CC)C1CCN(C(=O)CC(O)c2ncc(Cl)n2C)CC1]
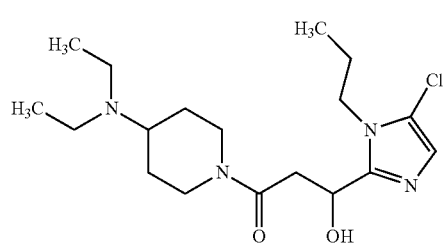 [SMILES: CCCn1c(Cl)cnc1C(O)CC(=O)N1CCC(N(CC)CC)CC1]
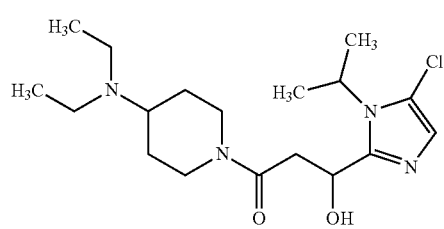 [SMILES: CCN(CC)C1CCN(C(=O)CC(O)c2ncc(Cl)n2C(C)C)CC1]
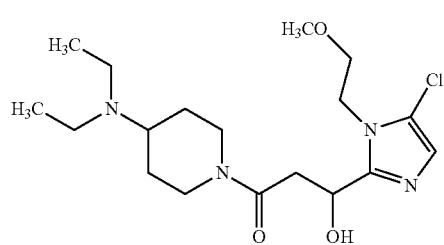 [SMILES: CCN(CC)C1CCN(C(=O)CC(O)c2ncc(Cl)n2CCOC)CC1]
TABLE 1-continued
Structural Formula
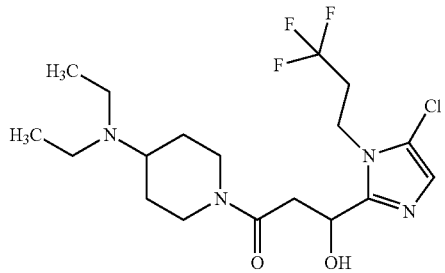 [SMILES: CCN(CC)C1CCN(C(=O)CC(O)c2ncc(Cl)n2CCC(F)(F)F)CC1]
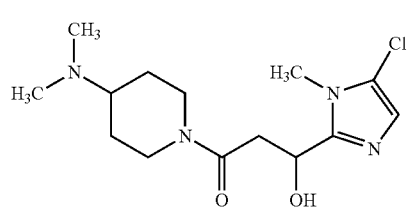 [SMILES: CN(C)C1CCN(C(=O)CC(O)c2ncc(Cl)n2C)CC1]
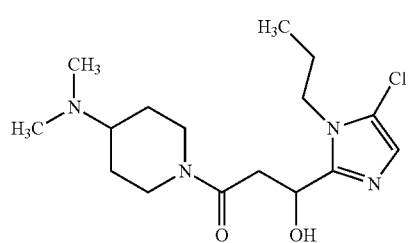 [SMILES: CCCn1c(Cl)cnc1C(O)CC(=O)N1CCC(N(C)C)CC1]
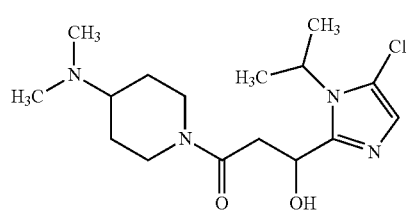 [SMILES: CC(C)n1c(Cl)cnc1C(O)CC(=O)N1CCC(N(C)C)CC1]
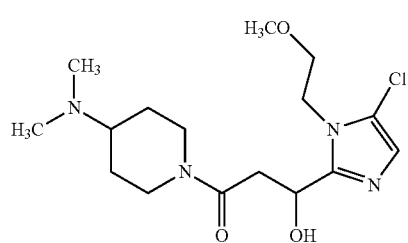 [SMILES: COCCn1c(Cl)cnc1C(O)CC(=O)N1CCC(N(C)C)CC1]
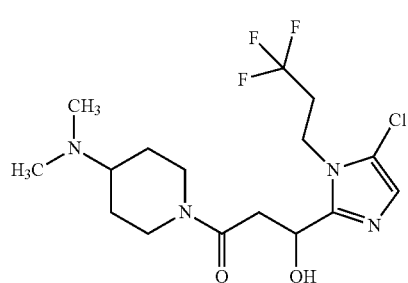 [SMILES: CN(C)C1CCN(C(=O)CC(O)c2ncc(Cl)n2CCC(F)(F)F)CC1]

TABLE 1-continued
Structural Formula
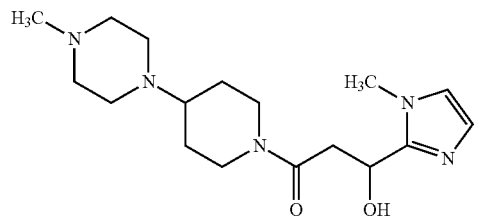 [SMILES: CN1CCN(C2CCN(C(=O)CC(O)c3nccn3C)CC2)CC1]
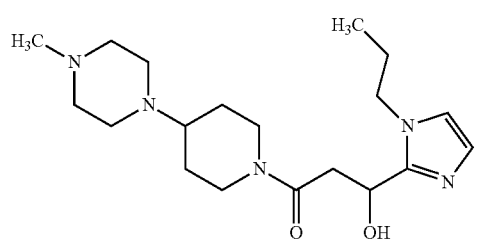 [SMILES: CCCn1ccnc1C(O)CC(=O)N1CCC(N2CCN(C)CC2)CC1]
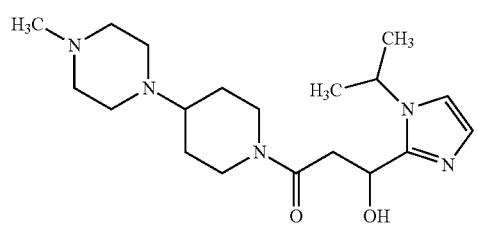 [SMILES: CC(C)n1ccnc1C(O)CC(=O)N1CCC(N2CCN(C)CC2)CC1]
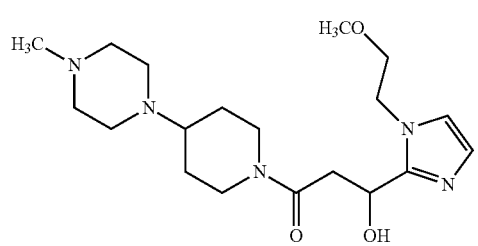 [SMILES: COCCn1ccnc1C(O)CC(=O)N1CCC(N2CCN(C)CC2)CC1]
TABLE 2
Structural Formula
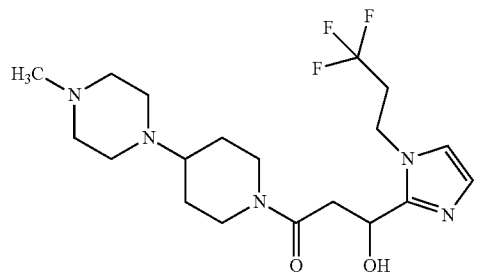 [SMILES: CN1CCN(C2CCN(C(=O)CC(O)c3nccn3CCC(F)(F)F)CC2)CC1]
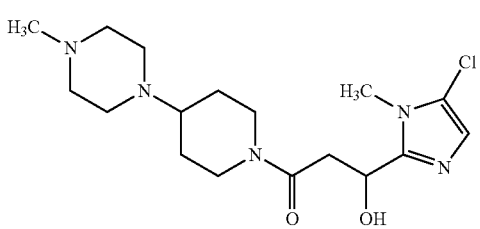 [SMILES: CN1CCN(C2CCN(C(=O)CC(O)c3ncc(Cl)n3C)CC2)CC1]
TABLE 2-continued
Structural Formula
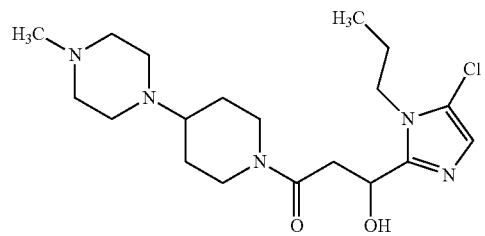 [SMILES: CCCn1c(Cl)cnc1C(O)CC(=O)N1CCC(N2CCN(C)CC2)CC1]
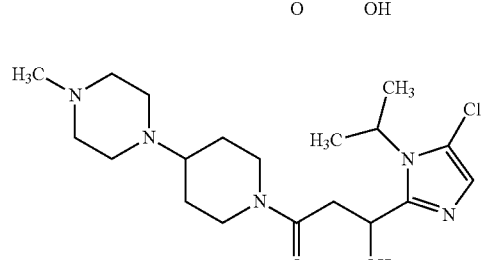
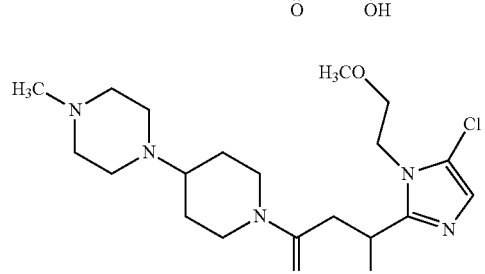
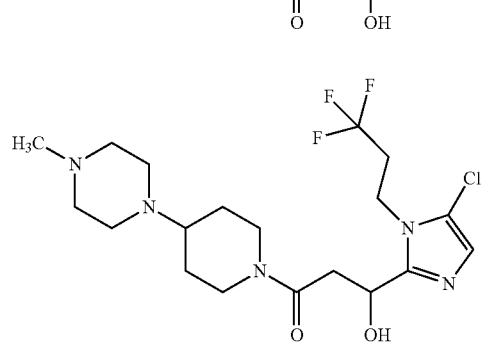
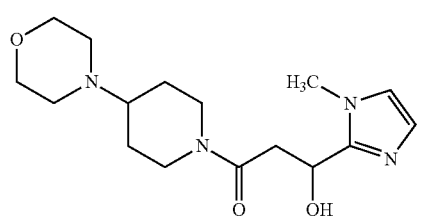 [SMILES: Cn1ccnc1C(O)CC(=O)N1CCC(N2CCOCC2)CC1]
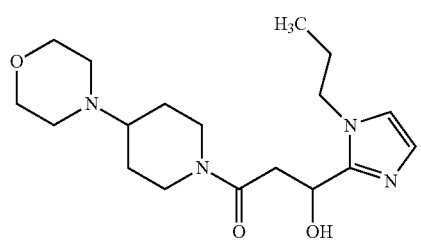 [SMILES: CCCn1ccnc1C(O)CC(=O)N1CCC(N2CCOCC2)CC1]

TABLE 2-continued

Structural Formula

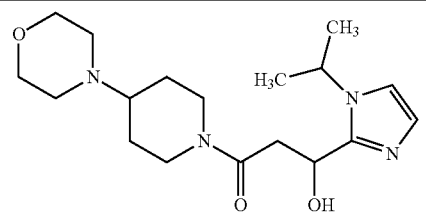

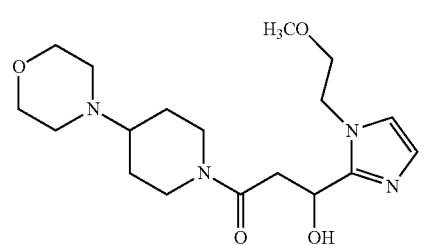 [SMILES: COCCn1ccnc1C(O)CC(=O)N1CCC(N2CCOCC2)CC1]

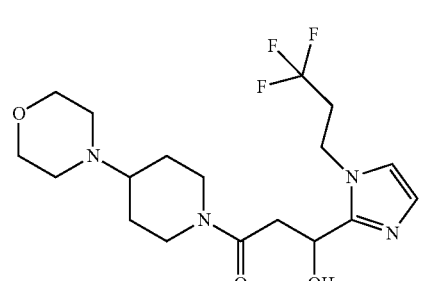

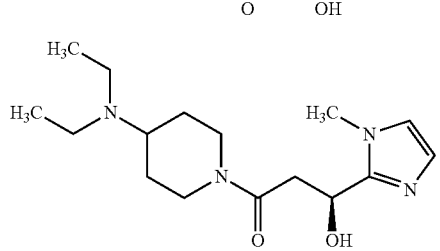

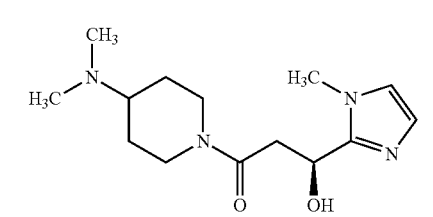 [SMILES: CN(C)C1CCN(C(=O)C[C@H](O)c2nccn2C)CC1]

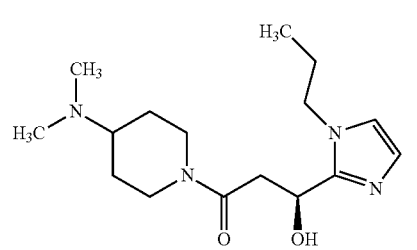 [SMILES: CCCn1ccnc1[C@@H](O)CC(=O)N1CCC(N(C)C)CC1]

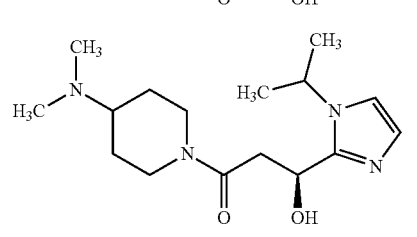

TABLE 2-continued

Structural Formula

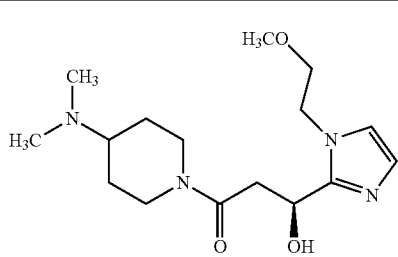

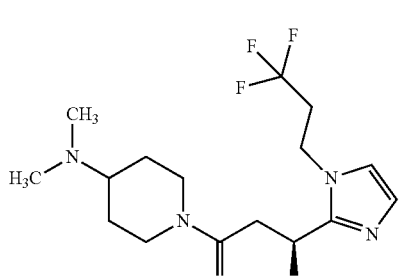

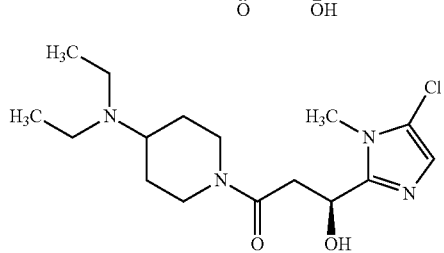

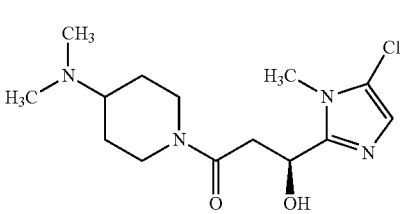 [SMILES: CN(C)C1CCN(C(=O)C[C@H](O)c2ncc(Cl)n2C)CC1]

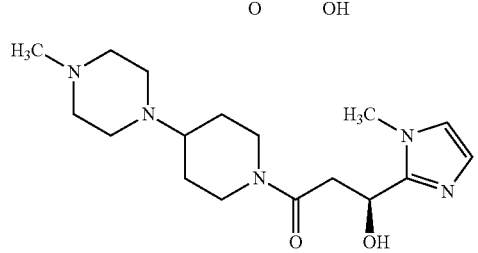

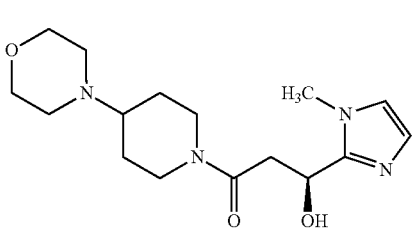 [SMILES: Cn1ccnc1[C@@H](O)CC(=O)N1CCC(N2CCOCC2)CC1]

When the cyclic amine derivative (I) has isomers such as enantiomers and stereoisomers, any one of isomers and mixtures of them are included in the cyclic amine derivative (I). In addition, when the cyclic amine derivative (I) has isomers such as enantiomers and stereoisomers, the cyclic amine derivative (I) may be a mixture comprising any one of isomers or mixtures of them. In addition, when the cyclic amine derivative (I) has conformational isomers, the cyclic amine derivative (I) includes any one of isomers and mixtures of them. A desired isomer can be obtained by a known method or a similar method thereto. For example, when an enantiomer of the cyclic amine derivative (I) is present, the enantiomer separated from the cyclic amine derivative (I) is also included in the cyclic amine derivative (I).

A desired enantiomer can be obtained by a known means (for example, an optically active synthetic intermediate is used or final-product racemic mixture is subjected to a known method or a similar method thereto (for example, optical resolution)).

A prodrug of a cyclic amine derivative (I) or a pharmacologically acceptable salt thereof is also included. The prodrug of the cyclic amine derivative (I) refers to a compound, which is enzymatically or chemically converted to the cyclic amine derivative (I) in vivo. The active form of a prodrug of the cyclic amine derivative (I) is the cyclic amine derivative (I); however a prodrug of the cyclic amine derivative (I) itself may have activity.

As the prodrug of the cyclic amine derivative (I), for example, a compound obtained by alkylation, phosphorylation or boration of a hydroxyl group of the cyclic amine derivative (I) can be mentioned. These compounds can be each synthesized from the cyclic amine derivative (I) in accordance with a known method.

A prodrug of the cyclic amine derivative (I) may be converted into the cyclic amine derivative (I) in physiological conditions described in known literature ("Development of pharmaceutical products," Hirokawa-Shoten Ltd., vol. 7, p. 163 to 198, 1990, and Progress in Medicine, vol. 5, p. 2157 to 2161, 1985).

The cyclic amine derivative (I) may be labeled with an isotope. Examples of isotopes for use in labeling include $^2$H, $^3$H, $^{13}$O, $^{14}$O, $^{15}$N, $^{15}$O and/or $^{18}$O.

As the pharmacologically acceptable salt of the cyclic amine derivative (I), for example, an inorganic salt such as a hydrochloride, a sulfate, a phosphate and a hydrobromide; or organic salt such as an oxalate, a malonate, a citrate, a fumarate, a lactate, a malate, a succinate, a tartrate, an acetate, a trifluoroacetate, a maleate, a gluconate, a benzoate, a salicylate, a xinafoate, a pamoate, an ascorbate, an adipate, a methanesulfonate, a p-toluenesulfonate and a cinnamate can be mentioned.

The cyclic amine derivative (I) or a pharmacologically acceptable salt thereof includes a hydrate and a solvate thereof.

When the cyclic amine derivative (I) or a pharmacologically acceptable salt thereof has crystalline polymorphs, the cyclic amine derivative (I) or the pharmacologically acceptable salt thereof includes all crystalline polymorphs and mixtures of them.

The cyclic amine derivative (I) or a pharmacologically acceptable salt thereof can be synthesized in accordance with a method described in known literature such as International Publication No. WO2016/136944, for example.

The term "advillin" encompasses an isoform, an analog, a variant, a fragment and a functional derivative. Advillin is a transcriptional product of advillin gene, is also designated as p92 or AVIL, and is one member of the gelsolin family. In a human, advillin is a protein having two isoforms, and consisting of 819 amino acids or 821 amino acids.

"Advillin" is a molecule that acts on an actin filament, and has a function of cutting the actin filament having a double helix structure.

The term "to promote advillin function" refers to retaining, sustaining, or enhancing the biological function of advillin, and/or normalizing the biological function deteriorated. The promotion of advillin function can be improvement and/or normalization of abnormality in regulation of actin filament turnover. Accordingly, if actin filaments have increased due to axonal injury of peripheral nerve, the promotion of advillin function decreases the actin filaments and increases a relative amount of actin monomers. The promotion of advillin function also includes promotion of axon extension.

The term "advillin complex" refers to an aggregation formed by advillin and a molecule of a protein or the like which interacts with and/or binding to advillin.

It can be evaluated, for example, by affinity purification using FG Beads (registered trademark) that are magnetic fine particles described in a known literature (Aono et al., 2018, Biochemical and Biophysical Research Communications, vol. 505, pp. 1203-1210), that the cyclic amine derivative (I) binds to advillin and/or an advillin complex. Alternatively, it can be evaluated by analyzing interaction between molecules by employing not only immunoprecipitation or affinity purification using an antibody recognizing advillin and/or the advillin complex but also surface plasmon resonance (SPR).

The term "actin filament turnover" refers to bidirectional turnover proceeding through actin monomer polymerization and actin filament depolymerization.

The term "abnormality in regulation of actin filament turnover" refers to that balance between actin polymerization and actin filament depolymerization in the "actin filament turnover" is lost to make unidirectional process dominant.

The term "to improve abnormality in regulation of actin filament turnover" means that the state where the monodirectional process is dominant in the "abnormality in regulation of actin filament turnover" is normalized or made closer to a normal state. Specifically, it means that the amount of actin filaments, and a ratio between the amount of actin filaments and the amount of actin monomers are normalized or made closer to normal.

It can be evaluated, by using cells (such as primary cultured human dorsal root ganglion neurons, primary cultured neurons of dorsal root ganglion derived from a mammal such as a rat or a mouse, PC12 cells derived from rat adrenal pheochromocytoma, or F11 cells derived from rat dorsal root ganglion) to measure the amount of actin filaments in the cells, that the cyclic amine derivative (I) or a pharmacologically acceptable salt thereof has an effect of improving abnormality in regulation of actin filament turnover. As a method of measuring the amount of actin filaments in cells, the measurement can be performed by, for example, fluorescent staining using fluorescent-labeled phalloidin binding to actin filaments (Carlson et al., Neuro Toxicology, 2001, vol. 22, pp. 819-827).

The term "effect of decreasing intracellular actin filaments" means an effect of decreasing the amount of intracellular actin filaments compared to when a treatment for decreasing the amount of intracellular actin filaments is not performed, and in this effect, the amount of intracellular actin filaments decreases preferably by 5% or more, 10% or more, 20% or more, 30% or more, 40% or more, 50% or more, 60% or more, 70% or more, 80% or more, 90% or more, or 100% as compared to when the treatment for decreasing the amount of intracellular actin filaments is not performed.

It can be evaluated, by using a sample of a disease related to the abnormality in regulation of actin filament turnover such as a tissue of a patient suffering from axonal injury or axonal injury animal model, to measure a ratio between the amount of actin filaments and the amount of actin monomers, that the cyclic amine derivative (I) or a pharmacologically acceptable salt thereof has the effect of improving abnormality in regulation of actin filament turnover. As the axonal injury animal model, for example, a rat spinal nerve ligation model (Kim et al., Pain, 1992, vol. 50, pp. 355-363) can be mentioned. The ratio between the amount of actin filaments and the amount of actin monomers can be calculated by separating actin filaments and actin monomers by ultracentrifugation of a tissue or a cell homogenate, and quantitatively determining the amounts of these by Western blotting (Kim et al., The journal of Physiology, 2015, vol. 593, pp. 1873-1886).

The term "axon" refers to a long projection extending from neuron cell body, and is also designated as neurite. Axon forms nerve fiber. An end of an axon is branched to be joined to a next neuron or target tissue for transmitting neuronal excitation.

The term "axonal injury" refers to a state in which an axon is partly or completely destroyed or cut, and a portion of the axon on the side of the tissue from the damaged site is degenerated or lost.

The term "axon extension" refers to extension of an axon of a neuron. The promotion of axon extension is expected to rejoin a target tissue to the axon and/or to reconstruct neural circuit after axonal injury.

Examples of a cause of axonal injury include, but are not limited to: surgical operation, a toxic substance, blood circulation disorder, an external wound caused by traffic accident or the like, or radiation therapy.

As the toxic substance, for example, exogenous and endogenous neurotoxins can be mentioned. As the exogenous neurotoxin, for example, tetrodotoxin, batrachotoxin, maurotoxin, agitoxin, charybdotoxin, margatoxin, slotoxin, scyllatoxin, hefutoxin, calciseptine, taicatoxin, or calciclu-dine can be mentioned. As the endogenous neurotoxin, for example, glutamic acid, N-methyl-D-aspartic acid (NMDA), or kainic acid can be mentioned. In addition, a gas (such as carbon monoxide), a metal (such as mercury), methanol, or ethanol can be mentioned. As other toxic substances, for example, agricultural chemicals of herbicides and insecticides (such as rotenone and paraquat) can be mentioned. A list of toxic substances and deleterious substances is published as toxic substances harmful to the human body by Poisonous and Deleterious Substances Control Law in Japan, and toxic substances listed therein can be mentioned as the toxic substance.

Examples of the disease related to axonal injury (including a disease caused by it) include, but are not limited to, carpal tunnel syndrome, pronator syndrome, anterior interosseous nerve palsy, ulnar tunnel syndrome (Guyon's tunnel syndrome), cubital tunnel syndrome, posterior interosseous nerve palsy, radial nerve palsy, thoracic outlet syndrome, axillary nerve palsy, suprascapular nerve palsy, piriformis muscle syndrome, lumbar plexus palsy, tarsal tunnel syndrome, femoral nerve palsy, sciatic nerve palsy, tibial nerve palsy, common peroneal nerve palsy, deep peroneal nerve palsy (anterior tarsal tunnel syndrome), saphenous nerve palsy (Hunter tunnel syndrome), cervical spinal canal stenosis, lumbar spinal canal stenosis, facial palsy, oculomotor paralysis, trochlear nerve palsy, abducens nerve palsy, giant cell arteritis, Takayasu arteritis, polyarteritis nodosa, Kawasaki disease, granulomatosis with polyangiitis (Wegener's granulomatosis), microscopic polyangiitis, eosinophilic granulomatosis with polyangiitis (allergic granulomatous angiitis, Churg-Strauss syndrome), cryoglobulinemia, IgA vasculitis (Henoch-Schonlein purpura), cutaneous leukocytoclastic vasculitis, systemic lupus erythematosus, Sjogren's syndrome, rheumatoid arthritis, mixed connective tissue disease, polymyositis, dermatomyositis, scleroderma, Behcet's disease, Bell's palsy, Ramsay Hunt syndrome, bacterial/viral infectious diseases (such as Lyme disease, HIV infectious disease, and leprosy), sarcoidosis, and malignant tumors.

It can be evaluated, by using a tissue in which an axon of a human neuron has been injured, axonal injury animal model, or a neuron (such as a neuron derived from the cerebral cortex, or a cell derived from dorsal root ganglion) to measure the length, density or the like of neurites having been extended, that the cyclic amine derivative (I) or a pharmacologically acceptable salt thereof has the effect of promoting axon extension (Yang et al., Free Radical Biology and Medicine, 2018, vol. 120, pp. 13-24).

The cyclic amine derivative (I) or a pharmacologically acceptable salt thereof can be used as a medicine to treat or prevent axonal injury in a mammal (for example, mouse, rat, hamster, rabbit, cat, dog, cow, sheep, monkey or human), and especially to a human.

When the cyclic amine derivative (I) or a pharmacologically acceptable salt thereof is used as a medicine, the cyclic amine derivative (I) or a pharmacologically acceptable salt thereof directly or in combination with a pharmaceutically acceptable carrier can be orally or parenterally administered.

As the dosage form when a medicine comprising the cyclic amine derivative (I) or a pharmacologically acceptable salt thereof as an active ingredient is orally administered, for example, tablets (including sugar-coated and film-coated tablets), pills, granules, powders, capsules (including soft capsules and micro capsules), syrups, emulsions and suspensions can be mentioned. As the dosage form when a medicine comprising the cyclic amine derivative (I) or a pharmacologically acceptable salt thereof as an active ingredient is parenterally administered, for example, injections, infusions, drops, suppositories, endermic liniments and adhesive patches can be mentioned. It is further effective to prepare a sustained-release formulation by using the cyclic amine derivative (I) or a pharmacologically acceptable salt thereof in combination with an appropriate base (for example, a butyric acid polymer, a glycolic acid polymer, a butyric acid-glycolic acid copolymer, mixtures of a butyric acid polymer and a glycolic acid polymer, or a polyglycerol fatty acid ester).

Formulations having the aforementioned dosage forms can be prepared in accordance with production methods known in the field of drug formulation. In this example, if necessary, production can be made by adding an excipient, a binder, a lubricant, a disintegrating agent, a sweetening agent, a surfactant, a suspending agent or an emulsifying agent, which is generally used in the field of drug formulation.

Tablets can be prepared, for example, by adding an excipient, a binder, a disintegrating agent or a lubricant. Pills and granules can be prepared by adding, for example, an excipient, a binder or a disintegrating agent. Powders and capsules can be prepared by adding, for example, an excipient. Syrups can be prepared by adding, for example, a sweetening agent. Emulsions or suspensions can be prepared by adding, for example, a surfactant, a suspending agent or an emulsifier.

As the excipient, for example, lactose, glucose, starch, sucrose, microcrystalline cellulose, powdered glycyrrhiza, mannitol, sodium hydrogen carbonate, calcium phosphate and calcium sulfate can be mentioned.

As the binder, for example, a starch paste solution, a gum arabic solution, a gelatin solution, a tragacanth solution, a carboxymethylcellulose solution, a sodium alginate solution and glycerin can be mentioned.

As the disintegrating agent, for example, starch and calcium carbonate can be mentioned.

As the lubricant, for example, magnesium stearate, stearic acid, calcium stearate and purified talc can be mentioned.

As the sweetening agent, for example, glucose, fructose, invert sugar, sorbitol, xylitol, glycerin and simple syrup can be mentioned.

As the surfactant, for example, sodium lauryl sulfate, polysorbate 80, sorbitan monofatty acid ester and stearic acid polyoxyl 40 can be mentioned.

As the suspending agent, for example, Gum arabic, sodium alginate, sodium carboxymethylcellulose, methyl cellulose and bentonite can be mentioned.

As the emulsifier, for example, Gum arabic, tragacanth, gelatin and polysorbate 80 can be mentioned.

When a medicine comprising the cyclic amine derivative (I) or a pharmacologically acceptable salt thereof as an active ingredient is prepared in the aforementioned dosage forms, a coloring agent, a preserving agent, a fragrance, a flavoring agent, a stabilizer or a thickener generally used in the field of drug formulation can be added.

The dose per day of a medicine comprising the cyclic amine derivative (I) or a pharmacologically acceptable salt thereof as an active ingredient varies depending upon, e.g., the state or body weight of the patient or the type or administration route of a compound, but, for example, in oral administration to an adult (weight: about 60 kg), it is preferable that the amount of the cyclic amine derivative (I) or a pharmacologically acceptable salt thereof serving as an active ingredient of 1 to 1000 mg is administered in 1 to 3 divided doses, and in parenteral administration to an adult (weight: about 60 kg) as injections, it is preferable that the amount of the cyclic amine derivative (I) or a pharmacologically acceptable salt thereof serving as an active ingredient of 0.01 to 100 mg per body weight (1 kg) is administered by intravenous injection.

The cyclic amine derivative (I) or a pharmacologically acceptable salt thereof may be blended with other medicinal agents in an appropriate ratio or used in combination with other medicinal agents to supplement or enhance a therapeutic or prophylactic effect or reduce the dose. The cyclic amine derivative (I) or a pharmacologically acceptable salt thereof may be administered concurrently with other medicinal agents or may be administered continuously therewith in an arbitrary order. As the other medicinal agents, for example, but are not limited to, therapeutic agents for treating axonal injury can be mentioned.

EXAMPLES

Hereinafter, our derivatives, medicines and methods will be specifically described in detail below with reference to Examples, Comparative Examples and Reference Example, but this disclosure is not limited to them.

In the following description, the names of the solvents shown in NMR data represent the solvents used in the measurement. The 400 MHz NMR spectra were measured by using JNM-AL 400 series Nuclear Magnetic Resonance spectrometer (manufactured by JEOL, Ltd.). Chemical shifts are expressed by δ (unit: ppm) using tetramethylsilane as the reference, and the respective signals respectively have the following meanings: s (singlet), d (doublet), t (triplet), q (quartet), quint (quintet), sept (septet), m (multiplet), br (broad), dd (double doublet), dt (double triplet), ddd (double double doublet), dq (double quartet), td (triple doublet), and tt (triple triplet). The ESI-MS spectra were measured by using Agilent Technologies 1200 Series, G6130A (manufactured by Agilent Technology). Commercially available products were used for all the solvents. For flash column chromatography, YFLC W-prep2XY (manufactured by YAMAZEN Corporation) was used.

Raw materials and intermediates of the cyclic amine derivative (I) were synthesized by the methods described in the Reference Examples below. Commercially available products were used for the compounds which were used in synthesizing the compounds of Reference Examples and whose synthesis methods are not described below.

Reference Example 1: Synthesis of Benzyl (S)-2-(3-(4-dimethylamino)piperidin-1-yl)-1-(1-methyl-1H-imidazol-2-yl)-3-oxopropoxy)acetate

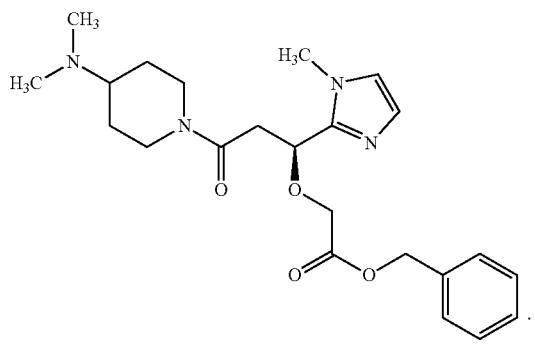 [SMILES: CN(C)C1CCN(C(=O)C[C@H](OCC(=O)OCc2ccccc2)c2nccn2C)CC1]

Sodium hydride (55%, 0.0202 mg, 0.464 mmol) was added to a solution of (S)-1-(4-(dimethylamino)piperidin-1-yl)-3-hydroxy-3-(1-methyl-1H-imidazol-2-yl)propan-1-one (0.100 g, 0.357 mmol) in tetrahydrofuran (0.800 mL) at 0° C. The resultant was stirred at the same temperature for 10 minutes, and benzyl bromoacetate (0.0620 mL, 0.390 mmol) added to the resultant reaction liquid, followed by stirring for further 15 hours at room temperature. An aqueous solution of ammonium chloride was added to the reaction liquid, and the resultant extracted with chloroform. The organic layer was washed with a 10% aqueous solution of sodium chloride, and then dried over anhydrous sodium sulfate and filtered. The filtrate was concentrated under reduced pressure. The residue was purified by flash column chromatography (NH silica gel, chloroform/methanol) to obtain benzyl (S)-2-(3-(4-dimethylamino)piperidin-1-yl)-1-(1-methyl-1H-imidazol-2-yl)-3-oxopropoxy)acetate (0.568 g, 0.133 mmol, 37%) as a colorless oil.

$^1$H-NMR (400 MHz, CDCl$_3$) δ: 1.30-1.57 (2H, m), 1.73-1.90 (2H, m), 2.24-2.37 (7H, m), 2.48-2.58 (1H, m), 2.95-3.13 (2H, m), 3.28-3.36 (1H, m), 3.70 (3H, d, J=1.6 Hz), 3.93-4.17 (3H, m), 4.48-4.54 (1H, m), 5.12-5.14 (2H, m), 5.30-5.36 (1H, m), 6.80 (1H, s), 6.96 (1H, s), 7.31-7.39 (5H, m).

ESI-MS: m/z=429 (M+H)$^+$.

Reference Example 2: Synthesis of Ethyl 1-methyl-1H-imidazole-2-carboxylate

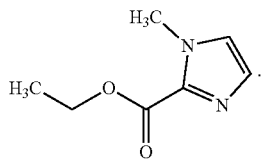

Triethylamine (3.40 mL, 24.4 mmol) and ethyl chloroformate (2.34 mL, 24.4 mmol) were added to a solution of 1-methyl-1H-imidazole (1.00 g, 12.2 mmol) in acetonitrile (4.0 mL) at 0° C., and the resultant reaction liquid stirred at room temperature for 16 hours. The reaction liquid was filtered through celite, and the filtrate concentrated under reduced pressure. The residue was purified by flash chromatography (silica gel, hexane/ethyl acetate) to obtain ethyl 1-methyl-1H-imidazole-2-carboxylate (1.50 g, 9.73 mmol, 80%) as a white solid.

$^1$H-NMR (400 MHz, CDCl$_3$) δ: 1.42 (3H, t, J=7.2 Hz), 4.01 (3H, s), 4.40 (2H, q, J=7.2 Hz), 7.01-7.03 (1H, m), 7.13-7.15 (1H, m).

ESI-MS: m/z=155 (M+H)$^+$.

Reference Example 3: Synthesis of Ethyl 3-(1-methyl-1H-imidazol-2-yl)-3-oxopropanoate

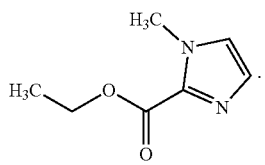

An aqueous solution of sodium hydroxide (1.0 N, 14.6 mL, 14.6 mmol) was added to a solution of ethyl 1-methyl-1H-imidazole-2-carboxylate (1.50 g, 9.73 mmol) in methanol (15.0 mL) at room temperature, and the resultant reaction liquid stirred at the same temperature for 3 hours. The reaction liquid was cooled to 0° C. Hydrochloric acid (1.0 N) was added to the reaction liquid for neutralization, and the resultant reaction liquid concentrated under reduced pressure. An azeotrope was formed with toluene, and ethanol added thereto. The thus obtained precipitate was filtered through celite, and the filtrate concentrated under reduced pressure. Acetonitrile (7.0 mL) and carbonyl diimidazole (1.54 g, 9.52 mmol) were added to the thus obtained crude product at room temperature, and the resultant reaction liquid stirred at the same temperature for 2.5 hours (reaction liquid A). Separately, magnesium chloride (0.997 g, 10.5 mmol) was dissolved in acetonitrile (7.0 mL), and ethyl potassium malonate (1.70 g, 9.99 mmol) and triethylamine (2.98 mL, 21.4 mmol) added thereto at room temperature, and the resultant reaction liquid was stirred at the same temperature for 2.5 hours (reaction liquid B). The reaction liquid A was added to the reaction liquid B at room temperature, and the resultant reaction liquid stirred at 80° C. for 2 hours. The reaction liquid was cooled to room temperature. Hydrochloric acid (1.0 N) was added to the reaction liquid, and the resultant extracted with ethyl acetate. The organic layer was washed with a 10% aqueous solution of sodium chloride, and then dried over anhydrous sodium sulfate and filtered. The filtrate was concentrated under reduced pressure. The residue was purified by flash chromatography (silica gel, hexane/ethyl acetate) to obtain ethyl 3-(1-methyl-1H-imidazol-2-yl)-3-oxopropanoate (0.721 g, 3.67 mmol, 38%) as a white solid.

$^1$H-NMR (400 MHz, CDCl$_3$) δ: 1.27 (3H, t, J=7.2 Hz), 4.01 (3H, s), 4.13 (2H, s), 4.21 (2H, q, J=7.2 Hz), 7.05-7.07 (1H, m), 7.15-7.17 (1H, m).

ESI-MS: m/z=197 (M+H)$^+$.

Reference Example 4: Synthesis of 4-(morpholin-4-yl)piperidine

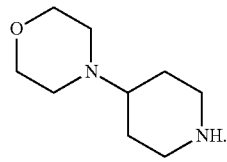 [SMILES: C1CC(N2CCOCC2)CCN1]

Morpholine (0.792 g, 9.09 mmol), sodium triacetoxyborohydride (1.93 g, 9.09 mmol) and acetic acid (0.0460 g, 0.758 mmol) were added to a solution of 1-tert-butoxycarbonyl-4-piperidinone (1.51 g, 7.58 mmol) in dichloromethane (25.0 mL) at 0° C., followed by stirring at room temperature for 16 hours. The resultant reaction liquid was cooled to 0° C. A saturated aqueous solution of sodium bicarbonate was added to the reaction liquid, and the resultant extracted with dichloromethane. The organic layer was dried over anhydrous sodium sulfate and filtered. The filtrate was concentrated under reduced pressure. The residue was dissolved in hydrochloric acid (1.0 N), and the resultant extracted with ethyl acetate. The aqueous layer was made basic by adding a 48% aqueous solution of sodium hydroxide thereto, and the resultant extracted with dichloromethane. The organic layer was dried over anhydrous sodium sulfate and filtered. The filtrate was concentrated under reduced pressure. The residue was dissolved in methanol (25.0 mL), and concentrated hydrochloric acid (5.0 mL) added thereto, followed by stirring at 40° C. for 12 hours. The resultant reaction liquid was concentrated to dryness, and the resultant dissolved in distilled water. The resultant was made basic by adding a 48% aqueous solution of sodium hydroxide thereto, and the resultant extracted with dichloromethane. The organic layer was dried over anhydrous sodium sulfate and filtered. The filtrate was concentrated under reduced pressure. Thus, 4-(morpholin-4-yl)piperidine (1.52 g, 5.63 mmol, 74%) was obtained as a yellow solid.

$^1$H-NMR (400 MHz, CDCl$_3$) δ: 1.34 (2H, dd, J=12.0, 4.0 Hz), 1.40 (2H, dd, J=12.0, 4.0 Hz), 1.85 (2H, d, J=12.4 Hz), 2.28 (1H, tt, J=11.2, 4.0 Hz), 3.53-3.63 (6H, m), 3.15 (2H, d, J=12.4 Hz), 3.73 (4H, t, J=4.4 Hz).

ESI-MS: m/z=171 (M+H)$^+$

Reference Example 5: Synthesis of 1-(1-methyl-1H-imidazol-2-yl)-3-(4-morpholinopiperidin-1-yl)propan-1,3-dione

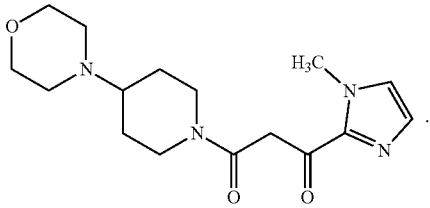 [SMILES: Cn1ccnc1C(=O)CC(=O)N1CCC(N2CCOCC2)CC1]

4-(Morpholin-4-yl)piperidine (0.158 g, 0.928 mmol) was added to a solution of ethyl 3-(1-methyl-1H-imidazol-2-yl)-3-oxopropanoate (0.200 g, 1.02 mmol) in toluene (0.460 mL) at room temperature, and the resultant reaction liquid stirred at 110° C. for 16 hours. The reaction liquid was concentrated under reduced pressure. The residue was purified by flash chromatography (silica gel, chloroform/methanol) to obtain 1-(1-methyl-1H-imidazol-2-yl)-3-(4-morpholinopiperidin-1-yl)propan-1,3-dione (0.285 g, 0.890 mmol, 96%) as a colorless oil.

$^1$H-NMR (400 MHz, CDCl$_3$) δ: 1.40-1.64 (2H, m), 1.82-1.92 (2H, m), 2.37-2.47 (1H, m), 2.52-2.58 (4H, m), 3.05-3.15 (1H, m), 3.69-3.76 (5H, m), 3.82-3.90 (1H, m), 4.01 (3H, s), 4.16-4.31 (2H, m), 4.58-4.65 (1H, m), 7.04-7.06 (1H, m), 7.13-7.15 (1H, m).

ESI-MS: m/z=321 (M+H)$^+$.

Reference Example 6: Synthesis of 1-propyl-1H-imidazole-2-carbaldehyde

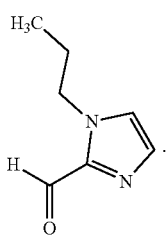

1-Iodopropane (1.22 mL, 12.5 mmol) and potassium carbonate (2.16 g, 15.6 mmol) were added to a solution of 1H-imidazole-2-carbaldehyde (1.00 g, 10.4 mmol) in N,N-dimethylformamide (10.0 mL), followed by stirring at 60° C. for 3 hours. Water was added to the resultant reaction liquid, and the resultant extracted with ethyl acetate. The organic layer was washed with a 10% aqueous solution of sodium chloride, and then dried over anhydrous sodium sulfate and filtered. The filtrate was concentrated under reduced pressure. The residue was purified by flash column chromatography (silica gel, hexane/ethyl acetate) to obtain 1-propyl-1H-imidazole-2-carbaldehyde (0.786 g, 5.69 mmol, 55%) as a yellow oil.

$^1$H-NMR (400 MHz, CDCl$_3$) δ: 0.93 (3H, t, J=7.4 Hz), 1.77-1.85 (2H, m), 4.37 (2H, t, J=7.2 Hz), 7.16 (1H, s), 7.28 (1H, s), 9.82 (1H, s).

Reference Example 7: Synthesis of 1-isopropyl-1H-imidazole-2-carbaldehyde

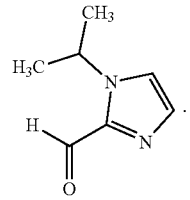

2-Iodopropane (1.26 mL, 12.5 mmol) and potassium carbonate (2.16 g, 15.6 mmol) were added to a solution of 1H-imidazole-2-carbaldehyde (1.00 g, 10.4 mmol) in N,N-dimethylformamide (10 mL), followed by stirring at 60° C. for 3 hours. Water was added to the resultant reaction liquid, and the resultant extracted with ethyl acetate. The organic layer was washed with a 10% aqueous solution of sodium chloride, and then dried over anhydrous sodium sulfate and filtered. The filtrate was concentrated under reduced pressure. The residue was purified by flash column chromatography (silica gel, hexane/ethyl acetate) to obtain 1-isopropyl-1H-imidazole-2-carbaldehyde (0.703 g, 5.09 mmol, 49%) as a yellow oil.

$^1$H-NMR (400 MHz, CDCl$_3$) δ: 1.47 (6H, t, J=6.6 Hz), 5.48 (1H, q, J=6.6 Hz), 7.30 (1H, s), 7.33 (1H, s), 9.83 (1H, s).

Reference Example 8: Synthesis of 5-chloro-1-methyl-1H-imidazole-2-carbaldehyde

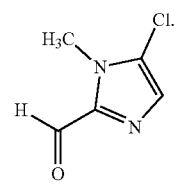

Dess-Martin reagent (1.04 g, 2.46 mmol) was added to a solution of (5-chloro-1-methyl-1H-imidazol-2-yl)methanol (0.300 g, 2.05 mmol) in dichloromethane (20.0 mL) at 0° C., followed by stirring at the same temperature for 3 hours. A 10% aqueous solution of sodium thiosulfate and a saturated aqueous solution of sodium bicarbonate were added to the resultant reaction liquid, and the resultant extracted with chloroform. The organic layer was washed with a 10% aqueous solution of sodium chloride, and then dried over anhydrous sodium sulfate and filtered. The filtrate was concentrated under reduced pressure. The residue was purified by flash column chromatography (silica gel, hexane/ethyl acetate) to obtain 5-chloro-1-methyl-1H-imidazole-2-carbaldehyde (0.235 g, 1.62 mmol, 79%) as a white solid.

$^1$H-NMR (400 MHz, CDCl$_3$) δ: 3.98 (3H, s), 7.24 (1H, s), 9.70 (1H, s).

Reference Example 9: Synthesis of 1-(2-methoxyethyl)-1H-imidazole-2-carbaldehyde

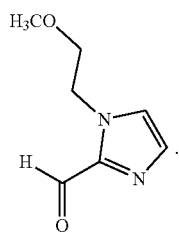

2-Bromoethylmethylether (1.20 mL, 12.5 mmol), potassium carbonate (2.16 g, 15.6 mmol), and sodium iodide (0.468 g, 3.12 mmol) were added to a solution of 1H-imidazole-2-carbaldehyde (1.00 g, 10.4 mmol) in N,N-dimethylformamide (10.0 mL), followed by stirring at 60° C. for 3 hours. Water was added to the resultant reaction liquid, and the resultant extracted with ethyl acetate. The organic layer was washed with a 10% aqueous solution of sodium chloride, and then dried over anhydrous sodium sulfate and filtered. The filtrate was concentrated under reduced pressure. The residue was purified by flash column chromatography (silica gel, hexane/ethyl acetate) to obtain 1-(2-methoxyethyl)-1H-imidazole-2-carbaldehyde (0.535 g, 3.47 mmol, 33%) as a white solid.

$^1$H-NMR (400 MHz, CDCl$_3$) δ: 3.32 (3H, s), 3.67 (2H, t, J=5.0 Hz), 4.59 (2H, t, J=5.0 Hz), 7.23-7.30 (2H, m), 9.81 (1H, s).

Reference Example 10: Synthesis of 1-(3,3,3-trifluoropropyl)-1H-imidazole-2-carbaldehyde

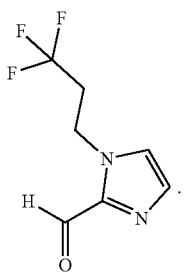

1,1,1-Trifluoro-3-iodopropane (0.710 mL, 6.24 mmol) and potassium carbonate (1.08 g, 7.81 mmol) were added to a solution of 1H-imidazole-2-carbaldehyde (0.500 g, 5.20 mmol) in N,N-dimethylformamide (5.20 mL), followed by stirring at 60° C. for 5 hours. Water was added to the resultant reaction liquid, and the resultant extracted with ethyl acetate. The organic layer was washed with a 10% aqueous solution of sodium chloride, and then dried over anhydrous sodium sulfate and filtered. The filtrate was concentrated under reduced pressure. The residue was purified by flash column chromatography (silica gel, hexane/ethyl acetate) to obtain 1-(3,3,3-trifluoropropyl)-1H-imidazole-2-carbaldehyde (0.0863 g, 0.449 mmol, 8.6%) as a colorless oil.

$^1$H-NMR (400 MHz, CDCl$_3$) δ: 2.60-2.72 (2H, m), 4.61 (2H, t, J=6.8 Hz), 7.18 (1H, s), 7.32 (1H, s), 9.83 (1H, s).

Reference Example 11: Synthesis of 1-(4-dimethylamino)piperidin-1-yl)ethanone

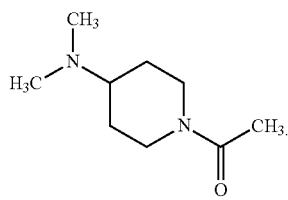

Pyridine (0.922 mL, 9.75 mmol) and acetic anhydride (0.946 mL, 11.7 mmol) were added to a solution of 4-dimethylaminopiperidine (1.00 g, 7.79 mmol) in dichloromethane (7.8 mL) at 0° C., and the resultant reaction liquid stirred at room temperature for 16 hours. A saturated aqueous solution of sodium bicarbonate was added to the resultant reaction liquid, and the resultant extracted with chloroform. The organic layer was washed with a 10% aqueous solution of sodium chloride, and then dried over anhydrous sodium sulfate and filtered. The filtrate was concentrated under reduced pressure. The residue was purified by flash column chromatography (NH silica gel, chloroform/methanol) to obtain 1-(4-(dimethylamino)piperidin-1-yl)ethanone (0.869 g, 6.78 mmol, 87%) as a colorless oil.

$^1$H-NMR (400 MHz, CDCl$_3$) δ: 1.30-1.47 (2H, m), 1.79-1.92 (2H, m), 2.10 (3H, s), 2.25-2.40 (7H, m), 2.53-2.63 (1H, m), 3.01-3.11 (1H, m), 3.81-3.90 (1H, m), 4.58-4.66 (1H, m).

ESI-MS: m/z=171 (M+H)$^+$.

Reference Example 12: Synthesis of 4-(1-methylpiperazin-4-yl)piperidine

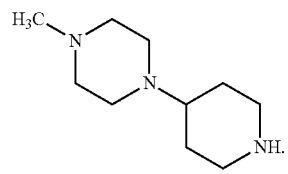

1-Methylpiperazine (0.905 g, 9.03 mmol), acetic acid (0.497 g, 8.28 mmol), and sodium triacetoxyborohydride (1.92 g, 9.03 mmol) were added to a solution of 1-tert-butoxycarbonyl-4-piperidinone (1.50 g, 7.53 mmol) in dichloromethane (25.0 mL) at 0° C., and the resultant reaction liquid stirred at room temperature for 16 hours. The reaction liquid was cooled to 0° C. A saturated aqueous solution of sodium bicarbonate was added to the reaction liquid, and the resultant extracted with dichloromethane. The organic layer was dried over anhydrous sodium sulfate and filtered. The filtrate was concentrated under reduced pressure. The residue was dissolved in hydrochloric acid (1.0 N), and the resultant extracted with ethyl acetate. The aqueous layer was made basic by adding a 48% aqueous solution of sodium hydroxide thereto, and the resultant extracted with dichloromethane. The organic layer was dried over anhydrous sodium sulfate and filtered. The filtrate was concentrated under reduced pressure. The residue was dissolved in methanol (25.0 mL), and concentrated hydrochloric acid (5.0 mL) added thereto, followed by stirring at 40°

C. for 12 hours. The resultant reaction liquid was concentrated under reduced pressure, and the resultant dissolved in distilled water. The resultant was made basic by adding a 48% aqueous solution of sodium hydroxide thereto, and the resultant extracted with dichloromethane. The organic layer was dried over anhydrous sodium sulfate and filtered. The filtrate was concentrated under reduced pressure to obtain 4-(1-methylpiperazin-4-yl)piperidine (0.826 g, 4.51 mmol, 60%) as a white solid.

$^1$H-NMR (400 MHz, CDCl$_3$) δ: 1.35 (2H, dd, J=12.0, 3.6 Hz), 1.41 (2H, dd, J=12.0, 3.6 Hz), 1.85 (2H, d, J=12.8 Hz), 1.96-2.06 (2H, br), 2.28 (3H, s), 2.32 (1H, tt, J=11.6, 3.6 Hz), 3.37-3.70 (8H, m), 3.14 (2H, d, J=12.8 Hz).

ESI-MS: m/z=169 (M+H)$^+$.

Reference Example 13: Synthesis of Crude 4-diethylaminopiperidine

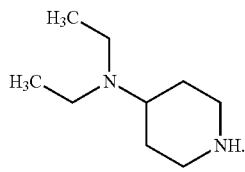

Diethylamine (0.276 mL, 2.68 mmol), acetic acid (0.0120 mL, 0.214 mmol), and sodium triacetoxyborohydride (0.681 g, 3.22 mmol) were added to a solution of benzyl 4-oxopiperidine-1-carboxylate (0.500 g, 2.14 mmol) in dichloromethane (12.0 mL) at 0° C., and the resultant reaction liquid stirred at room temperature for 16 hours. The reaction liquid was cooled to 0° C. A saturated aqueous solution of sodium bicarbonate was added to the reaction liquid, and the resultant extracted with chloroform. The organic layer was dried over anhydrous sodium sulfate and filtered. The filtrate was concentrated under reduced pressure. The residue was purified by flash column chromatography (NH silica gel, chloroform/methanol). The thus obtained crudely purified product was dissolved in methanol (8.0 mL), and palladium/carbon (10% wet, 0.180 g, 0.169 mmol) added thereto at room temperature, followed by stirring under a hydrogen atmosphere for 16 hours. The resultant reaction liquid was filtered through celite, and the filtrate concentrated under reduced pressure to obtain a crude product of 4-diethylaminopiperidine.

Reference Example 14: Synthesis of 1-(4-(dimethylamino)piperidin-1-yl)-3-(1-methyl-1H-imidazol-2-yl)propan-1,3-dione

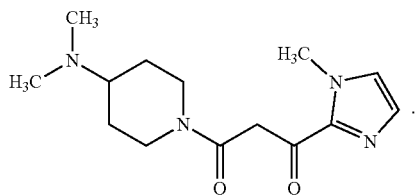 [SMILES: CN(C)C1CCN(C(=O)CC(=O)c2nccn2C)CC1]

A solution of lithium diisopropylamide in tetrahydrofuran (2.0 M, 7.05 mL, 14.1 mmol) was added dropwise to a solution of 1-(4-(dimethylamino)piperidin-1-yl)ethanone (1.00 g, 5.87 mmol) in tetrahydrofuran (20 mL) at −78° C., followed by stirring at the same temperature for 1 hour. A solution of ethyl 1-methyl-1H-imidazole-2-carboxylate (1.09 g, 7.05 mmol) in tetrahydrofuran (9.0 mL) was added to the resultant reaction liquid at the same temperature, and the resultant stirred for 1 hour, and then at 0° C. for further 1 hour. A saturated aqueous solution of ammonium chloride and an aqueous solution of potassium carbonate were successively added to the resultant reaction liquid, and the resultant extracted with chloroform. The organic layer was washed with a 10% aqueous solution of sodium chloride, and then dried over anhydrous sodium sulfate and filtered. The filtrate was concentrated under reduced pressure. The residue was purified by flash column chromatography (NH silica gel, hexane/ethyl acetate) to obtain 1-(4-(dimethylamino)piperidin-1-yl)-3-(1-methyl-1H-imidazol-2-yl)propan-1,3-dione (0.990 g, 3.56 mmol, 61%) as a colorless oil.

$^1$H-NMR (400 MHz, CDCl$_3$) δ: 1.32-1.5 (2H, m), 1.80-1.94 (2H, m), 2.22-41 (7H, m), 2.60-2.70 (1H, m), 3.03-3.13 (1H, m), 3.80-3.89 (1H, m), 4.01 (3H, s), 4.23 (2H, dd, J=15.6, 36.8 Hz), 4.55-4.67 (1H, m), 7.05 (1H, s), 7.14 (1H, s).

ESI-MS: m/z=279 (M+H)$^+$.

Reference Example 15: Synthesis of 1-(1-methyl-1H-imidazol-2-yl)-3-(4-(4-methylpiperazin-1-yl)piperidin-1-yl)propan-1,3-dione

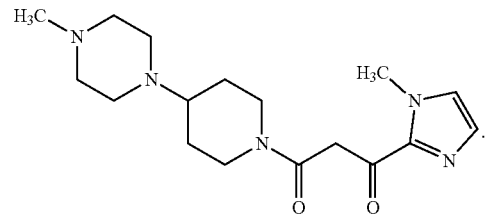 [SMILES: CN1CCN(C2CCN(C(=O)CC(=O)c3nccn3C)CC2)CC1]

4-(1-Methylpiperazin-4-yl)piperidine (0.170 g, 0.927 mmol) was added to a solution of ethyl 3-(1-methyl-1H-imidazol-2-yl)-3-oxopropanoate (0.200 g, 1.02 mmol) in toluene (0.46 mL) at room temperature, and the resultant reaction liquid stirred at 110° C. for 16 hours. The reaction liquid was concentrated under reduced pressure. The residue was purified by flash column chromatography (NH silica gel, chloroform/methanol) to obtain 1-(1-methyl-1H-imidazol-2-yl)-3-(4-(4-methylpiperazin-1-yl)piperidin-1-yl)propan-1,3-dione (0.290 g, 0.870 mmol, 94%) as a colorless oil.

$^1$H-NMR (400 MHz, CDCl$_3$) δ: 1.38-1.60 (2H, m), 1.82-1.90 (2H, m), 1.95-2.10 (1H, m), 2.27 (3H, s), 2.36-2.68 (9H, m), 3.02-3.12 (1H, m), 3.79-3.88 (1H, m), 3.98 (3H, s), 4.13-4.28 (2H, m), 4.57-4.90 (1H, m), 7.02-7.04 (1H, m), 7.11-7.13 (1H, m).

ESI-MS: m/z=334 (M+H)$^+$.

Reference Example 16: Synthesis of 1-(4-(diethyl-amino)piperidin-1-yl)-3-(1-methyl-1H-imidazol-2-yl)propan-1,3-dione

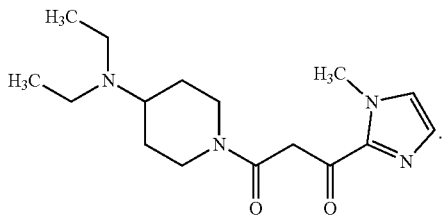 [SMILES: CCN(CC)C1CCN(C(=O)CC(=O)c2nccn2C)CC1]

Crude 4-diethylaminopiperidine (0.143 g, 0.917 mmol) was added to a solution of ethyl 3-(1-methyl-1H-imidazol-2-yl)-3-oxopropanoate (0.150 g, 0.765 mmol) in toluene (0.38 mL) at room temperature, and the resultant reaction liquid stirred at 110° C. for 10 hours. The reaction liquid was concentrated under reduced pressure. The residue was purified by flash column chromatography (NH silica gel, chloroform/methanol) to obtain 1-(4-(diethylamino)piperidin-1-yl)-3-(1-methyl-1H-imidazol-2-yl)propan-1,3-dione (0.0750 g, 0.245 mmol, 32%) as a colorless oil.

$^1$H-NMR (400 MHz, CDCl$_3$) δ: 1.02 (6H, t, J=6.8 Hz), 1.37-1.58 (2H, m), 1.73-1.98 (2H, m), 2.48-2.78 (6H, m), 3.01-3.11 (1H, m), 3.80-3.88 (1H, m), 4.00 (3H, s), 4.14-4.28 (2H, m), 4.60-4.70 (1H, m), 7.03-7.05 (1H, m), 7.12-7.14 (1H, m).

ESI-MS: m/z=307 (M+H)$^+$.

Reference Example 17; Synthesis of 1-(4-(dimethylamino)piperidin-1-yl)-3-hydroxy-3-(1-methyl-1H-imidazol-2-yl)propan-1-one

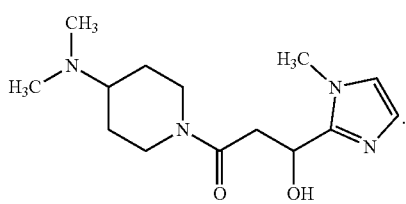 [SMILES: CN(C)C1CCN(C(=O)CC(O)c2nccn2C)CC1]

A solution of lithium diisopropylamide in tetrahydrofuran (2.0 M, 0.162 mL, 0.323 mmol) was added dropwise to a solution of 1-(4-(dimethylamino)piperidin-1-yl)ethanone (0.0500 g, 0.294 mmol) in tetrahydrofuran (0.8 mL) at −78° C., followed by stirring at the same temperature for 1 hour. A solution of 1-methyl-1H-imidazole-2-carbaldehyde (0.0390 g, 0.352 mmol) in tetrahydrofuran (0.4 mL) was added to the resultant reaction liquid at the same temperature, and the resultant stirred for 1 hour, and then at 0° C. for further 1 hour. A saturated aqueous solution of ammonium chloride and an aqueous solution of potassium carbonate were successively added to the resultant reaction liquid, and the resultant extracted with chloroform. The organic layer was washed with a 10% aqueous solution of sodium chloride, and then dried over anhydrous sodium sulfate and filtered. The filtrate was concentrated under reduced pressure. The residue was purified by flash column chromatography (silica gel, chloroform/methanol) to obtain 1-(4-(dimethylamino)piperidin-1-yl)-3-hydroxy-3-(1-methyl-1H-imidazol-2-yl)propan-1-one (0.0220 g, 0.0785 mmol, 27%) as a colorless oil.

$^1$H-NMR (400 MHz, CDCl$_3$) δ: 1.32-1.53 (2H, m), 1.82-1.92 (2H, m), 2.27-2.41 (7H, m), 2.60-2.72 (1H, m), 2.98-3.23 (3H, m), 3.77 (3H, s), 3.99-4.08 (1H, m), 4.58-4.82 (2H, m), 5.18-5.26 (1H, m), 6.86 (1H, s), 6.93 (1H, s).

ESI-MS: m/z=281 (M+H)$^+$.

Example 1: Synthesis of 3-hydroxy-3-(1-methyl-1H-imidazol-2-yl)-1-(4-morpholinopiperidin-1-yl)propan-1-one

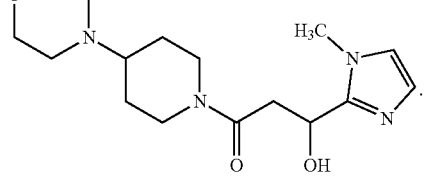

Sodium borohydride (0.0370 g, 0.979 mmol) was added to a solution of 1-(1-methyl-1H-imidazol-2-yl)-3-(4-morpholinopiperidin-1-yl)propan-1,3-dione (0.285 g, 0.890 mmol) in methanol (4.50 mL) at room temperature, and the resultant reaction liquid stirred at the same temperature for 3 hours. A saturated aqueous solution of sodium bicarbonate was added to the reaction liquid, and the resultant concentrated under reduced pressure. Distilled water was added to the residue, and the resultant extracted with chloroform. The organic layer was washed with a 10% aqueous solution of sodium chloride, and then dried over anhydrous sodium sulfate and filtered. The filtrate was concentrated under reduced pressure. The residue was purified by flash chromatography (silica gel, chloroform/methanol) to obtain 3-hydroxy-3-(1-methyl-1H-imidazol-2-yl)-1-(4-morpholinopiperidin-1-yl)propan-1-one (0.0711 g, 0.221 mmol, 25%) (hereinafter, the compound of Example 1) as a colorless oil.

$^1$H-NMR (400 MHz, DMSO-d$_6$) δ: 1.08-1.50 (7H, m), 1.60-1.76 (2H, m), 2.36-2.46 (5H, m), 2.75-3.05 (3H, m), 3.64 (3H, s), 3.92-4.02 (1H, m), 4.32-4.42 (1H, m), 4.99-5.08 (1H, m), 5.34-5.49 (1H, m), 6.70-6.72 (1H, m), 7.01-7.03 (1H, m).

ESI-MS: m/z=323 (M+H)$^+$.

Example 2: Synthesis of 1-(4-(dimethylamino)piperidin-1-yl)-3-(1-propyl-1H-imidazol-2-yl)-3-hydroxypropan-1-one

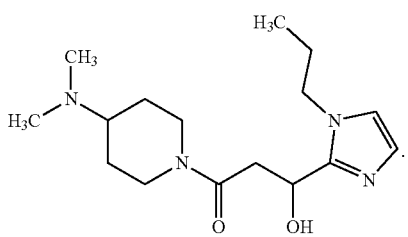 [SMILES: CCCn1ccnc1C(O)CC(=O)N1CCC(N(C)C)CC1]

A solution of lithium diisopropylamide in tetrahydrofuran (2.0 M, 0.969 mL, 1.94 mmol) was added dropwise to a solution of 1-(4-dimethylaminopiperidin-1-yl)ethanone (0.300 g, 1.76 mmol) in tetrahydrofuran (6.00 mL) at −78° C., followed by stirring at the same temperature for 1 hour.

A solution of 1-propyl-1H-imidazole-2-carbaldehyde (0.292 g, 2.12 mmol) in tetrahydrofuran (2.8 mL) was added to the resultant reaction liquid at the same temperature, and the resultant stirred for 1 hour, and then at 0° C. for further 1 hour. A saturated aqueous solution of ammonium chloride and an aqueous solution of potassium carbonate were successively added to the resultant reaction liquid, and the resultant extracted with chloroform. The organic layer was washed with a 10% aqueous solution of sodium chloride, and then dried over anhydrous sodium sulfate and filtered. The filtrate was concentrated under reduced pressure. The residue was purified by flash column chromatography (NH silica gel, chloroform/methanol) to obtain 1-(4-(dimethylamino)piperidin-1-yl)-3-(1-propyl-1H-imidazol-2-yl)-3-hydroxypropan-1-one (0.296 g, 0.960 mmol, 55%) (hereinafter, the compound of Example 2) as a colorless oil.

$^1$H-NMR (400 MHz, DMSO-$d_6$) δ: 0.85 (3H, t, J=7.4 Hz), 1.00-1.40 (2H, m), 1.61-1.80 (4H, m), 2.10-2.33 (7H, m), 2.45-2.59 (1H, m), 2.73-2.88 (1H, m), 2.93-3.13 (2H, m), 3.86-4.00 (3H, m), 4.25-4.35 (1H, m), 4.98-5.05 (1H, m), 5.34-5.40 (1H, m), 6.72 (1H, s), 7.07 (1H, s).

ESI-MS: m/z=309 (M+H)+.

Example 3: Synthesis of 1-(4-(dimethylamino)piperidin-1-yl)-3-(1-isopropyl-1H-imidazol-2-yl)-3-hydroxypropan-1-one

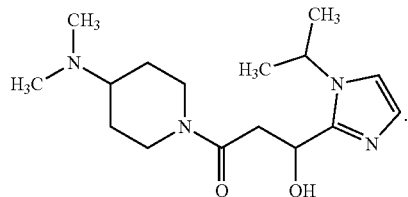 [SMILES: CC(C)n1ccnc1C(O)CC(=O)N1CCC(N(C)C)CC1]

A solution of lithium diisopropylamide in tetrahydrofuran (2.0 M, 0.969 mL, 1.94 mmol) was added dropwise to a solution of 1-(4-dimethylaminopiperidin-1-yl)ethanone (0.300 g, 1.76 mmol) in tetrahydrofuran (6.00 mL) at −78° C., followed by stirring at the same temperature for 1 hour. A solution of 1-isopropyl-1H-imidazol-2-carbaldehyde (0.292 g, 2.12 mmol) in tetrahydrofuran (2.8 mL) was added to the resultant reaction liquid at the same temperature, and the resultant stirred for 1 hour, and then at 0° C. for further 1 hour. A saturated aqueous solution of ammonium chloride and an aqueous solution of potassium carbonate were successively added to the resultant reaction liquid, and the resultant extracted with chloroform. The organic layer was washed with a 10% aqueous solution of sodium chloride, and then dried over anhydrous sodium sulfate and filtered. The filtrate was concentrated under reduced pressure. The residue was purified by flash column chromatography (NH silica gel, chloroform/methanol) to obtain 1-(4-(dimethylamino)piperidin-1-yl)-3-(1-isopropyl-1H-imidazol-2-yl)-3-hydroxypropan-1-one (0.302 g, 0.979 mmol, 56%) (hereinafter, the compound of Example 3) as a colorless oil.

$^1$H-NMR (400 MHz, DMSO-$d_6$) δ: 1.04-1.41 (8H, m), 1.62-1.80 (2H, m), 2.16 (6H, s), 2.25-2.34 (1H, m), 2.48-2.59 (2H, m), 2.76-2.88 (1H, m), 2.95-3.16 (2H, m), 3.90-4.00 (1H, m), 4.27-4.38 (1H, m), 5.05-5.12 (1H, m), 5.36-5.42 (1H, m), 6.77 (1H, s), 7.20 (1H, s).

ESI-MS: m/z=309 (M+H)+.

Example 4: Synthesis of 3-(5-chloro-1-methyl-1H-imidazol-2-yl)-1-(4-(dimethylamino)piperidin-1-yl)-3-hydroxypropan-1-one

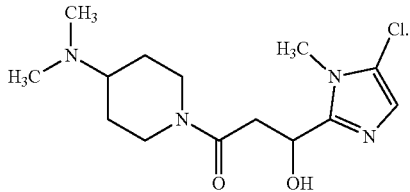 [SMILES: CN(C)C1CCN(C(=O)CC(O)c2ncc(Cl)n2C)CC1]

A solution of lithium diisopropylamide in tetrahydrofuran (2.0 M, 0.745 mL, 1.49 mmol) was added dropwise to a solution of 1-(4-dimethylaminopiperidin-1-yl)ethanone (0.231 g, 1.36 mmol) in tetrahydrofuran (5.10 mL) at −78° C., followed by stirring at the same temperature for 1 hour. A solution of 5-chloro-1-methyl-1H-imidazole-2-carbaldehyde (0.235 g, 1.63 mmol) in tetrahydrofuran (1.70 mL) was added to the resultant reaction liquid at the same temperature, and the resultant stirred for 1 hour, and then at 0° C. for further 1 hour. A saturated aqueous solution of ammonium chloride and an aqueous solution of potassium carbonate were successively added to the resultant reaction liquid, and the resultant extracted with chloroform. The organic layer was washed with a 10% aqueous solution of sodium chloride, and then dried over anhydrous sodium sulfate and filtered. The filtrate was concentrated under reduced pressure. The residue was purified by flash column chromatography (NH silica gel, chloroform/methanol) to obtain 3-(5-chloro-1-methyl-1H-imidazol-2-yl)-1-(4-(dimethylamino)piperidin-1-yl)-3-hydroxypropan-1-one (0.159 g, 0.505 mmol, 37%) (hereinafter, the compound of Example 4) as a colorless oil.

$^1$H-NMR (400 MHz, DMSO-$d_6$) δ: 1.04-1.21 (1H, m), 1.28-1.40 (1H, m), 1.64-1.80 (2H, m), 2.15 (6H, s), 2.24-2.35 (1H, m), 2.44-2.60 (1H, m), 2.78-2.88 (1H, m), 2.95-3.11 (2H, m), 3.59 (3H, s), 3.90-3.98 (1H, m), 4.27-4.35 (1H, m), 5.00-5.10 (1H, m), 5.50-5.58 (1H, m), 6.85 (1H, s).

ESI-MS: m/z=315 (M+H)+.

Example 5: Synthesis of 1-(4-(dimethylamino)piperidin-1-yl)-3-(1-(2-methoxyethyl)-1H-imidazol-2-yl)-3-hydroxypropan-1-one

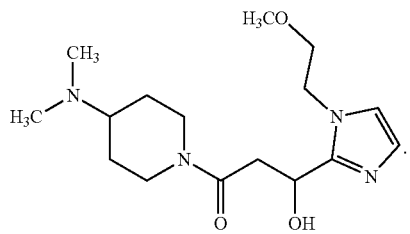 [SMILES: COCCn1ccnc1C(O)CC(=O)N1CCC(N(C)C)CC1]

A solution of lithium diisopropylamide in tetrahydrofuran (2.0 M, 0.969 mL, 1.94 mmol) was added dropwise to a solution of 1-(4-dimethylaminopiperidin-1-yl)ethanone (0.300 g, 1.76 mmol) in tetrahydrofuran (6.00 mL) at −78° C., followed by stirring at the same temperature for 1 hour. A solution of 1-(2-methoxyethyl)-1H-imidazole-2-carbaldehyde (0.292 g, 2.12 mmol) in tetrahydrofuran (2.80 mL) was added to the resultant reaction liquid at the same temperature, and the resultant stirred for 1 hour, and then at 0° C. for further 1 hour. A saturated aqueous solution of ammonium chloride and an aqueous solution of potassium carbonate were successively added to the resultant reaction liquid, and the resultant extracted with chloroform. The organic layer was washed with a 10% aqueous solution of sodium chloride, and then dried over anhydrous sodium sulfate and filtered. The filtrate was concentrated under reduced pressure. The residue was purified by flash column chromatography (NH silica gel, chloroform/methanol) to obtain 1-(4-(dimethylamino)piperidin-1-yl)-3-(1-(2-methoxyethyl)-1H-imidazol-2-yl)-3-hydroxypropan-1-one (0.193 g, 0.594 mmol, 34%) (hereinafter, the compound of Example 5) as a colorless oil.

$^1$H-NMR (400 MHz, DMSO-$d_6$) δ: 1.04-1.40 (2H, m), 1.62-1.80 (2H, m), 2.10-2.35 (7H, m), 2.46-2.59 (1H, m), 2.80-2.90 (1H, m), 2.95-3.10 (2H, m), 3.24 (3H, s), 3.61 (2H, t, J=5.5 Hz), 3.90-4.00 (1H, m), 4.10-4.38 (3H, m), 5.05-5.11 (1H, m), 5.38-5.42 (1H, m), 6.73 (1H, s), 7.07 (1H, s).

ESI-MS: m/z=325 (M+H)+.

Example 6: Synthesis of 1-(4-(dimethylamino)piperidin-1-yl)-3-(1-(3,3,3-trifluoropropyl)-1H-imidazol-2-yl)-3-hydroxypropan-1-one

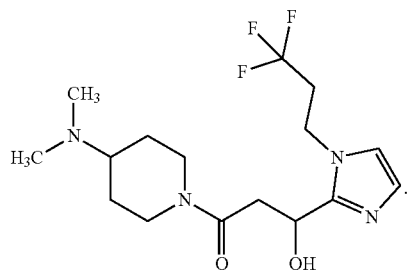 [SMILES: CN(C)C1CCN(C(=O)CC(O)c2nccn2CCC(F)(F)F)CC1]

A solution of lithium diisopropylamide in tetrahydrofuran (2.0 M, 0.246 mL, 0.492 mmol) was added dropwise to a solution of 1-(4-dimethylaminopiperidin-1-yl)ethanone (0.0760 g, 0.448 mmol) in tetrahydrofuran (1.80 mL) at −78° C., followed by stirring at the same temperature for 1 hour. A solution of 1-(3,3,3-trifluoropropyl)-1H-imidazole-2-carbaldehyde (0.0860 g, 0.448 mmol) in tetrahydrofuran (0.70 mL) was added to the resultant reaction liquid at the same temperature, and the resultant stirred for 1 hour, and then at 0° C. for further 1 hour. A saturated aqueous solution of ammonium chloride and an aqueous solution of potassium carbonate were successively added to the resultant reaction liquid, and the resultant extracted with chloroform. The organic layer was washed with a 10% aqueous solution of sodium sulfate and filtered. The filtrate was concentrated under reduced pressure. The residue was purified by flash column chromatography (NH silica gel, chloroform/methanol) to obtain 1-(4-(dimethylamino)piperidin-1-yl)-3-(1-(3,3,3-trifluoropropyl)-1H-imidazol-2-yl)-3-hydroxypropan-1-one (0.0845 g, 0.233 mmol, 52%) (hereinafter, the compound of Example 6) as a colorless oil.

$^1$H-NMR (400 MHz, DMSO-$d_6$) δ: 1.03-1.40 (2H, m), 1.63-1.79 (2H, m), 2.10-2.33 (7H, m), 2.47-2.59 (1H, m), 2.78-2.90 (1H, m), 2.95-3.13 (2H, m), 3.90-3.98 (1H, m), 4.21-4.36 (3H, m), 5.03-5.10 (1H, m), 5.49-5.54 (1H, m), 6.77 (1H, s), 7.17 (1H, s).

ESI-MS: m/z=363 (M+H)+.

Example 7: Synthesis of (S)-1-(4-(dimethylamino)piperidin-1-yl)-3-hydroxy-3-(1-methyl-1H-imidazol-2-yl)propan-1-one

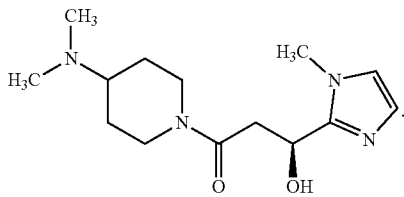 [SMILES: CN(C)C1CCN(C(=O)C[C@H](O)c2nccn2C)CC1]

1-(4-(Dimethylamino)piperidin-1-yl)-3-hydroxy-3-(1-methyl-1H-imidazol-2-yl)propan-1-one (3.32 g) was optically resolved by HPLC purification, and the eluate was concentrated under reduced pressure. The residue was purified by flash column chromatography (NH silica gel, chloroform/methanol) to obtain (S)-1-(4-(dimethylamino)piperidin-1-yl)-3-hydroxy-3-(1-methyl-1H-imidazol-2-yl)propan-1-one (0.467 g, >99% ee) (hereinafter, the compound of Example 7) as a white solid.

HPLC retention time: 8.4 min, apparatus: LC-10ADvp system, manufactured by Shimadzu Corporation, column: CHIRALCEL OZ-H, 4.6×250 mm (manufactured by Daicel Corporation), solvent: 0.01% ethylenediamine-containing methanol (v/v), flow rate: 0.5 mL/min, detection method: UV 220 nm, column temperature: 40° C.

$^1$H-NMR (400 MHz, CDCl$_3$) δ: 1.32-1.53 (2H, m), 1.82-1.92 (2H, m), 2.27-2.41 (7H, m), 2.60-2.72 (1H, m), 2.98-3.23 (3H, m), 3.77 (3H, s), 3.99-4.08 (1H, m), 4.58-4.82 (2H, m), 5.18-5.26 (1H, m), 6.86 (1H, s), 6.93 (1H, s).

ESI-MS: m/z=281 (M+H)$^+$.

Example 8: Synthesis of 3-hydroxy-3-(1-methyl-1H-imidazol-2-yl)-1-(4-(4-methylpiperazin-1-yl)piperidin-1-yl)propan-1-one

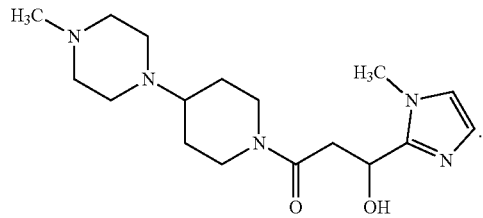 [SMILES: CN1CCN(C2CCN(C(=O)CC(O)c3nccn3C)CC2)CC1]

Sodium borohydride (0.0360 g, 0.957 mmol) was added to a solution of 1-(1-methyl-1H-imidazol-2-yl)-3-(4-(4-methylpiperazin-1-yl)piperidin-1-yl)propan-1,3-dione (0.290 g, 0.870 mmol) in methanol (4.4 mL) at room temperature, and the resultant reaction liquid stirred at the same temperature for 3 hours. A saturated aqueous solution of sodium bicarbonate was added to the resultant reaction liquid, and the resultant concentrated under reduced pressure. Distilled water was added to the residue, and the resultant extracted with chloroform. The organic layer was washed with a 10% aqueous solution of sodium chloride, and then dried over anhydrous sodium sulfate and filtered. The filtrate was concentrated under reduced pressure. The residue was purified by flash column chromatography (NH silica gel, chloroform/methanol) to obtain 3-hydroxy-3-(1-methyl-1H-imidazol-2-yl)-1-(4-(4-methylpiperazin-1-yl)piperidin-1-yl)propan-1-one (0.140 g, 0.417 mmol, 48%) (hereinafter, the compound of Example 8) as a colorless oil.

$^1$H-NMR (400 MHz, DMSO-$d_6$) δ: 1.45-1.66 (4H, m), 1.87-1.95 (2H, m), 2.26-2.30 (3H, s), 2.38-2.70 (8H, m), 2.98-3.23 (3H, m), 3.77 (3H, s), 4.00-4.10 (1H, m), 4.60-4.70 (2H, m), 5.17-5.25 (1H, m), 6.85-6.88 (1H, m), 6.92-6.95 (1H, m).

ESI-MS: m/z=336 (M+H)$^+$.

Example 9: Synthesis of 1-(4-(diethylamino)piperidin-1-yl)-3-hydroxy-3-(1-methyl-1H-imidazol-2-yl)propan-1-one

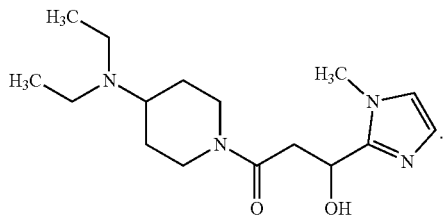 [SMILES: CCN(CC)C1CCN(C(=O)CC(O)c2nccn2C)CC1]

Sodium borohydride (0.0109 g, 0.287 mmol) was added to a solution of 1-(4-diethylamino)piperidin-1-yl)-3-(1-methyl-1H-imidazol-2-yl)propan-1,3-dione (0.0800 g, 0.261 mmol) in methanol (1.3 mL) at room temperature, and the resultant reaction liquid stirred at the same temperature for 3 hours. A saturated aqueous solution of sodium bicarbonate was added to the resultant reaction liquid, and the resultant concentrated under reduced pressure. Distilled water was added to the residue, and the resultant extracted with chloroform. The organic layer was washed with a 10% aqueous solution of sodium chloride, and then dried over anhydrous sodium sulfate and filtered. The filtrate was concentrated under reduced pressure. The residue was purified by flash column chromatography (NH silica gel, chloroform/methanol) to obtain 1-(4-(diethylamino)piperidin-1-yl)-3-hydroxy-3-(1-methyl-1H-imidazol-2-yl)propan-1-one (0.0561 g, 0.182 mmol, 70%) (hereinafter, the compound of Example 9) as a colorless oil.

$^1$H-NMR (400 MHz, DMSO-$d_6$) δ: 0.94 (6H, t, J=6.8 Hz), 1.05-1.75 (5H, m), 2.42-3.10 (8H, m), 3.64 (3H, s), 3.93-4.02 (1H, m), 4.32-4.43 (1H, m), 5.00-5.08 (1H, m), 5.34-5.42 (1H, m), 6.69-6.71 (1H, m), 7.01-7.03 (1H, m).

ESI-MS: m/z=309 (M+H)$^+$.

Example 10: Evaluation of Binding of Cyclic Amine Derivative (I) to Membrane Fractions Prepared from Various Tissues of Rat A binding property of a $^3$H-labeled cyclic amine derivative (I) to each of membrane fractions prepared from various tissues of a rat was evaluated, and thus, a tissue containing a molecular target of the cyclic amine derivative (I) was clarified.

As the cyclic amine derivative (I), the compound of Example 7 was used.

Male SD rats (manufactured by Charles River Laboratories Japan, Inc.) of 7 weeks old were used. Rats were anesthetized with isoflurane, and euthanized by exsanguination from the abdominal aorta using a syringe having an inner wall treated with a heparin sodium injection (manufactured by AY Pharmaceuticals Co., Ltd.). Within 60 minutes after the euthanasia by exsanguination, the cerebrum, the cerebellum, the brainstem, the brainstem, the spinal cord, the dorsal root ganglion, the sciatic nerve, the skin, the heart, the muscle, the liver, the kidney, and the small intestine were excised. As the cerebrum, the right and left cerebral hemispheres were collected. The cerebellum was collected from the whole brain. The brainstem was collected after removing the cerebrum and the cerebellum from the whole brain. The spinal cord was collected by excising a part of the thoracic spinal cord and the lumbar spinal cord, peeling off the dura mater, and removing remaining nerve roots. As the dorsal root ganglion, right and left lumbar ganglia (L3 to L6) were collected. The sciatic nerve was collected by excising right and left sciatic nerves, and removing adhering tissues such as fat. As the skin, a part of the skin of a footpad portion of a front or hind limb was collected. As the heart, the whole excised heart was collected. As the muscle, a part of the quadriceps was collected. As the liver, the left lateral lobe was collected. As the kidney, the whole excised kidney was collected. As the small intestine, the content was washed out, and a portion having a length of about 5 cm was collected from around the duodenum and the jejunum. The tissues thus collected were immediately frozen on dry ice, and stored at −80° C. As for each of the dorsal root ganglion, the sciatic nerve, the muscle and the skin, tissues collected from ten individuals were mixed to be dealt with as one sample. As for each of the other tissues, tissues collected from three rats were mixed to be dealt with as one sample.

A homogenate sample of each tissue thus collected was prepared, using a homogenizer, by adding a homogenize buffer (sucrose (1 M), Tris-HCl (0.5 M), and 1× protease inhibitor cocktail (manufactured by Sigma Aldrich), pH 7.6) to the collected tissue. Each homogenate sample was centrifuged at 1,000×g at 4° C. for 10 minutes to remove a non-disrupted portion of the tissue. The resultant supernatant was ultracentrifuged at 100,000×g at 4° C. for 60 minutes, and the thus obtained precipitate was suspended in Krebs-Ringer bicarbonate buffer (manufactured by Sigma Aldrich) to quantitatively determine the amount of protein using a BCA protein assay kit (manufactured by Thermo Fisher Scientific K.K.).

A reaction between a membrane fraction and the $^3$H-labeled compound of Example 7 was carried out in a microtube all using Krebs-Ringer bicarbonate buffer. Samples each obtained by adding a solution of the compound of Example 7 (unlabeled, 400 μM, 100 μL) to a protein solution of a membrane fraction of each tissue (0.2 mg/mL, 200 μL) were designated as a sample group A, and samples each obtained by adding Krebs-Ringer bicarbonate buffer (100 μL) were designated as a sample group B.

The $^3$H-labeled compound of Example 7 containing octyl-β-D-thioglucopyranoside (0.4% (w/v)) (80 nM, 100 μL) was added to each of the samples of the sample groups A and B, and the resultant was rapidly transferred to an incubator at 37° C. to start the reaction. After incubation for 1 hour, the resultant was cooled on ice for 5 minutes or more to stop the reaction. Each of the resultant reaction liquids was added to a glass filter (manufactured by Perkin Elmer Co., Ltd.) immersed in a 0.05% polyethyleneimine solution in advance, and the pressure was rapidly reduced for suction filtration to cause the membrane fraction to be adsorbed on the glass filter. The glass filter was washed with Krebs-Ringer bicarbonate buffer six times, 10 mL of Hionic-Fluor (manufactured by Perkin Elmer Co., Ltd.) was added to the resultant, and radioactivity of the thus bound $^3$H-labeled compound of Example 7 measured as a disintegration rate (hereinafter, the dpm) by liquid scintillation. A specific binding (dpm/μg) was calculated as a value (dpm/μg) obtained by dividing, by the amount of protein, a difference between an average of measured values of the dpm of the sample group B and an average of measured values of the dpm of the sample group A.

The membrane fractions prepared from the respective tissues of the rats and evaluation results of the binding property of the $^3$H-labeled compound of Example 7 are illustrated in FIG. 2. The vertical axis of FIG. 2 indicates the specific binding (dpm/μg) (average, two samples of each group). The horizontal axis indicates the membrane fractions prepared from the tissues of the cerebrum, the cerebellum, the brainstem, the spinal cord, the dorsal root ganglion, the sciatic nerve, the heart, the liver, the kidney, the small intestine, the muscle, and the skin from the left.

As a result, the specific binding of the compound of Example 7 to each membrane fraction prepared from the respective tissues was significant in the membrane fraction prepared from the dorsal root ganglion. Secondly, the specific binding to the membrane fraction prepared from the sciatic nerve was 42% of the specific binding to the membrane fraction prepared from the dorsal root ganglion. The specific binding to the membrane fraction prepared from the spinal cord was 23% of the specific binding to the membrane fraction prepared from the dorsal root ganglion. The specific binding to the membrane fraction prepared from the brainstem was 4.2% of the specific binding to the membrane fraction prepared from the dorsal root ganglion, and the specific bindings to the membrane fractions prepared from the other tissues including the brain were less than 1% of the specific binding to the membrane fraction prepared from the dorsal root ganglion. The compound of Example 7 was thus specifically bound to the membrane fractions prepared from the peripheral nerves such as the dorsal root ganglion and the sciatic nerve, or the spinal cord. We thus found that the molecular target of the compound of Example 7 is present in the peripheral nerves or the spinal cord, and that the cyclic amine derivative (I) acts through binding to a membrane present in the peripheral nerves or the spinal cord.

Example 11: Identification of Binding Molecule of Cyclic Amine Derivative (I) or Pharmacologically Acceptable Salt Thereof To identify a binding molecule of the cyclic amine derivative (I) or a pharmacologically acceptable salt thereof, affinity purification using FG beads immobilized with the cyclic amine derivative (I), and comprehensive identification were carried out.

To immobilize, through an amide bond, the cyclic amine derivative (I) with FG beads having an amino group linker, a cyclic amine derivative having a carboxyl group was synthesized.

As the cyclic amine derivative having a carboxyl group, (S)-2-(3-(4-(dimethylamino)piperidin-1-yl)-1-(1-methyl-1H-imidazol-2-yl)-3-oxopropoxy) acetic acid (hereinafter, a compound for immobilizing beads) represented by chemical formula was used to perform the synthesis as follows:

Synthesis of Compound for Immobilizing Beads

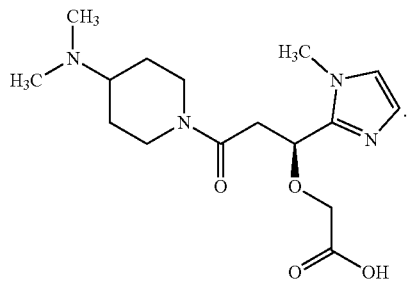 [SMILES: CN(C)C1CCN(C(=O)C[C@H](OCC(=O)O)c2nccn2C)CC1]

Palladium-carbon (10% wet, 14.0 mg) was added to a solution of benzyl (S)-2-(3-(4-(dimethylamino)piperidin-1-yl)-1-(1-methyl-1H-imidazol-2-yl)-3-oxopropoxy) acetate (0.0550 g, 0.128 mmol) in ethanol (2.50 mL) at room temperature, followed by stirring for 6 hours under a hydrogen atmosphere. The resultant reaction liquid was filtered through celite, and the filtrate concentrated under reduced pressure to obtain (S)-2-(3-(4-(dimethylamino)piperidin-1-yl)-1-(1-methyl-1H-imidazol-2-yl)-3-oxopropoxy) acetic acid (0.0404 g, 0.119 mmol, 93%) as a colorless oil.

$^1$H-NMR (400 MHz, CDCl$_3$) δ: 1.30-1.69 (2H, m), 1.88-2.10 (2H, m), 2.40-2.63 (7H, m), 2.88-3.20 (3H, m), 3.21-3.41 (1H, m), 3.74-3.98 (5H, m), 4.09-4.27 (1H, m), 4.63-4.78 (1H, m), 5.20-5.26 (1H, m), 6.84 (1H, s), 6.95 (1H, s).

ESI-MS: m/z=339 (M+H)$^+$.

The compound for immobilizing beads was fixed on NH$_2$ beads (5 mg, manufactured by Tamagawa Seiki Co., Ltd.). First, a solution of the compound for immobilizing beads (20 mM, 200 μL), a solution of succinimide (200 mM, 20 μL), and a solution of 1-ethyl-3-(3-dimethylaminopropyl)carbodiimide (200 mM, 20 μL) were added to N,N-dimethylformamide (160 μL), and the resultant mixture reacted using a microtube mixer at room temperature for 2 hours to prepare an activated solution of the compound for immobilizing beads. Subsequently, N,N-dimethylformamide (900 μL) and the activated solution of the compound for immobilizing beads (100 μL) were added to NH$_2$ beads, and the resultant reacted using a microtube mixer at room temperature overnight. The resultant was washed with N,N-dimethylformamide (500 μL) three times, acetic anhydride added thereto to obtain a concentration of 20%, and the resultant reacted using a microtube mixer at room temperature for 2 hours. Ultimately, the resultant was washed with 50% methanol (500 μL) three times to obtain beads immobilized with the cyclic amine derivative.

A protein solution to be reacted with the beads immobilized with the cyclic amine derivative was prepared from rat dorsal root ganglia. Dorsal root ganglia were separated from male SD rats of 6 weeks old (manufactured by Charles River Laboratories Japan, Inc.). Rats were anesthetized with urethane, and euthanized by exsanguination from abdominal aorta. After incision of the dorsal part, the spinal column was excised and cooled on ice. The dorsal side of the spinal column was cut off, and the spinal cord was removed from the ventral side of the spinal column. Then, the dorsal root ganglia (T11 to T13 and L3 to 6, left and right) with bundles of nerve fibers were excised with precision tweezers. The excised dorsal root ganglia were dipped in ice-cold Leibovitz's L-15 medium (manufactured by Thermo Fisher Scientific), and the bundles of nerve fibers were removed under a stereoscopic microscope to separate dorsal root ganglia. The separated dorsal root ganglia were frozen with liquid nitrogen to be stored at −80° C. As the dorsal root ganglia, tissues collected from 21 individuals were mixed to be dealt with as one sample.

The dorsal root ganglia were homogenized in an assay buffer (NaCl (140 mM), KCl (5 mM), $CaCl_2 \cdot 2H_2O$ (1.2 mM), $MgCl_2 \cdot 6H_2O$ (2 mM), D(+)-glucose (14 mM), Hepes (10 mM), and protease inhibitor cocktail (manufactured by Sigma Aldrich), pH 7.4) using a Dounce homogenizer to prepare a dorsal root ganglion homogenate. A surfactant n-Dodecyl-β-D-Maltopyranoside (manufactured by Sigma Aldrich) was added to the dorsal root ganglion homogenate to obtain a concentration of 1%, and the resultant incubated at 4° C. for 1 hour. The resultant was centrifuged at 20,400×g for 30 minutes, and the resultant supernatant diluted 40 times, and the resultant concentrated with Amicon Ultra 3 kDa (manufactured by Merck Millipore Ltd.).

The beads immobilized with the cyclic amine derivative and the protein solution were mixed to be reacted at 4° C. overnight. The resultant beads were washed with the assay buffer three times, then washed with PBS(−) once, and suspended in PBS(−). Proteins binding to the beads were comprehensively identified by shotgun proteomics (LC-MS/MS).

Proteins not binding to beads not immobilized with compound but binding to the beads immobilized with the cyclic amine derivative are shown in Table 3. Entry IDs (rats) and names of the proteins are cited from protein database Uniprot (www.uniprot.org/). A protein having an entry ID F1LTJ5 is, however, listed as Uncharacterized Protein in the Uniprot database, but is shown as an ortholog of basement membrane-specific heparan sulfate proteoglycan core protein in PANTHER Classification System. Hence, the name of this protein is shown in Table 3 as basement membrane-specific heparan sulfate proteoglycan core protein.

TABLE 3

| Entry ID (uniprot) | Name of Protein |
|---|---|
| F1LTJ5 | Basement membrane-specific heparan sulfate proteoglycan core protein |
| M0RCA6 | Advillin |
| Q9QYF3 | Unconventional myosin-Va |
| P19139 | Casein kinase II subunit α |
| D3ZN27 | DnaJ heat shock protein family (Hsp40) member C13 |
| Q925G1 | Hepatoma-derived growth factor-related protein2 |
| F1LPD0 | Collagen alpha-1(XV) chain-like protein |
| P47853 | Biglycan |

Among the eight molecules thus identified, advillin is reported to highly express in a peripheral nerve tissue compared to that in other tissues (Ravenall et al., European Journal of Neuroscience, 2002, vol. 27, pp. 14404-14414). Since it is revealed in Example 10 that the molecular target of the compound of Example 7 is a molecule present in a large amount in a peripheral nerve, it is suggested that the molecular target of the cyclic amine derivative (I) may be possibly advillin.

It is also reported that advillin forms a complex with myosin identified in this example (Chuang et al., Proceedings of the National Academy of Sciences of the United States of America, 2018, vol. 115, pp. E8557-E8566). Accordingly, it is suggested that the cyclic amine derivative (I) or a pharmacologically acceptable salt thereof may bind to advillin and/or an advillin complex containing a protein identified in this example or the like, and regulate advillin function.

Example 12: Effect of Decreasing Intracellular Actin Filaments in Rat Dorsal Root Ganglion Neuron Cell Line The effect of the cyclic amine derivative (I) or a pharmacologically acceptable salt thereof on the amount of intracellular actin filaments in F11 cells (rat dorsal root ganglion neuron cell line) was examined.

As test compounds, the compounds of Examples 1, 2, 3, 4, 5, 6, 7, 8, and 9 were used.

As compounds of comparative examples, 1-(4-(dimethylamino)piperidin-1-yl)-3-(1-ethyl-1H-imidazol-2-yl)-3-hydroxypropan-1-one (hereinafter, the compound of Comparative Example 1), 1-(4-(dimethylamino)piperidin-1-yl)-3-hydroxy-3-(1-(2,2,2-trifluoroethyl)-1H-imidazol-2-yl) propan-1-one (hereinafter, the compound of Comparative Example 2), 1-((R)-3-(dimethylamino)pyrrolidin-1-yl)-3-hydroxy-3-(1-methyl-1H-imidazol-2-yl)propan-1-one (hereinafter, the compound of Comparative Example 3), and 1-((R)-3-(3-(dimethylamino)piperidin-1-yl)-3-hydroxy-3-(1-methyl-1H-imidazol-2-yl)propan-1-one (hereinafter, the compound of Comparative Example 4) shown in Table 4 were used. The compounds of Comparative Examples 1, 2, 3, and 4 were synthesized in accordance with methods described in International Publication No. WO2016/136944.

TABLE 4

| Compound | Structural Formula |
|---|---|
| Compound of Comparative Example 1 | (structure shown) |
| Compound of Comparative Example 2 | (structure shown) |
| Compound of Comparative Example 3 | (structure shown) |
| Compound of Comparative Example 4 | (structure shown) |

For peeling the F11 cells off from a culture flask, 0.25% Trypsin/EDTA (manufactured by Thermo Fisher Scientific K.K.) was added to the cells, followed by incubation at room temperature for several minutes. Thereafter, 10% fetal bovine serum-containing DMEM medium (manufactured by Thermo Fisher Scientific K.K.) was added thereto for suspension, and the resultant centrifuged at 1,500 rpm for 1 minute. After removing the resultant centrifugal supernatant, 0.5% fetal bovine serum-containing DMEM medium was added thereto for suspending cells therein, and the resultant seeded in a poly-D-lysine-coated 96 well plate (manufactured by BD Biosciences) coated with laminin (2 μg/cm$^2$, manufactured by Sigma Aldrich) to be cultured at 37° C. under an environment of 5% $CO_2$. Two hours after seeding the cells, N,N-dibutyladenosine 3',5'-phosphate (final concentration 1 mM, manufactured by Sigma Aldrich) and recombinant rat GDNF (final concentration 50 ng/mL, manufactured by PeproTech) were added thereto to culture the cells at 37° C. under an environment of 5% $CO_2$ for 7 days for differentiation.

Seven days after starting the culture, the medium was exchanged with 0.5% fetal bovine serum-containing DMEM medium containing oxaliplatin (final concentration 15 μM), and the resultant cultured for 5 days to induce axonal injury. Each of the compounds of Examples and Comparative Examples was caused to be contained in the medium (final concentration 10 μM) for treatment in the same manner as oxaliplatin.

Five days after treatment with oxaliplatin and each of the compounds, the resultant cells were washed with PBS(−) three times, a 4% paraformaldehyde-phosphate buffer (manufactured by Wako Pure Chemical Industries Ltd.) was added thereto, and the resultant allowed to stand still at room temperature for 10 minutes to fix the cells. Acti-stain 670 phalloidin (manufactured by Cytoskeleton Inc.) was added thereto, and the resultant incubated at room temperature for 30 minutes to stain actin filaments. An image of the cells was acquired using IN Cell Analyzer 2200 (manufactured by GE Healthcare), and the image analyzed using IN Cell Investigator Developer Toolbox. The amount of intracellular actin filaments was indicated by the amount of fluorescence (density) of fluorescent-labeled phalloidin binding to the actin filaments.

In a group treated with oxaliplatin alone (hereinafter, the oxaliplatin alone treated group), the amount of intracellular actin filaments increased by 5% compared to that in a group not treated with oxaliplatin. Since the amount thus statistically significantly increased, we confirmed that abnormality in regulation of actin filament turnover had been induced ($p<0.05$, Student's t-test). A decreasing rate of intracellular actin filaments, caused by each compound compared to the amount of intracellular actin filaments of the oxaliplatin alone treated group was calculated.

Effects of decreasing intracellular actin filaments of the respective compounds in the F11 cells are shown in Table 5. In "Decreasing Rate of Intracellular Actin Filaments" of the table, a ratio (%) of the amount of intracellular actin filaments decreased by the treatment with each compound compared to the amount of intracellular actin filaments of the oxaliplatin alone treated group is shown (average value, each group including five samples assuming that one sample corresponds to one well). In "Test Compound" of the table, a compound treated group treated with a corresponding one of the compounds is shown.

TABLE 5

| Test Compound | Decreasing Rate of Intracellular Actin Filament (%) |
| --- | --- |
| Compound of Example 1 | 5.2 |
| Compound of Example 2 | 11.8 |

TABLE 5-continued

| Test Compound | Decreasing Rate of Intracellular Actin Filament (%) |
| --- | --- |
| Compound of Example 3 | 9.9 |
| Compound of Example 4 | 8.5 |
| Compound of Example 5 | 9.6 |
| Compound of Example 6 | 6.7 |
| Compound of Example 7 | 9.6 |
| Compound of Example 8 | 6.4 |
| Compound of Example 9 | 17.5 |
| Compound of Comparative Example 1 | 2.1 |
| Compound of Comparative Example 2 | 4.5 |
| Compound of Comparative Example 3 | 2.4 |
| Compound of Comparative Example 4 | 3.8 |

Compared to the solvent treated group, the amount of intracellular actin filaments decreased by 5% or more by the compounds of Examples 1, 2, 3, 4, 5, 6, 7, 8, and 9. On the other hand, the decreasing rates of intracellular actin filaments of the compounds of Comparative Examples 1, 2, 3, and 4 were 5% or less.

Example 13: Effect of Improving Abnormality in Regulation of Actin Filament Turnover in Rat Spinal Nerve Ligation Model The effect of the cyclic amine derivative (I) or a pharmacologically acceptable salt thereof on a ratio between the amount of actin filaments and the amount of actin monomers in the sciatic nerve of a rat spinal nerve ligation model was examined.

Male SD rats (manufactured by Charles River Laboratories Japan, Inc.) of 6 weeks old were used. Each rat spinal nerve ligation model was produced by resecting the spine vertebral arch by incision of the right lower back under isoflurane inhalation anesthesia, completely ligating L5 and L6 nerve roots of the spinal nerve, and then suturing the muscular layer and the skin. As a negative control (sham-operation group), the right L5 and L6 nerves were exposed, and then the muscular layer and the skin were sutured similarly without ligation. One week after the nerve ligation, the rats were used to perform the following experiment.

The compound of Example 7 was orally administered to each rat spinal nerve ligation model at any of three doses of 6, 20 and 60 mg/kg once a day for 2 days. Three hours after the last administration, the sciatic nerve was collected under anesthesia with isoflurane, and the rat was euthanized. The collected sciatic nerve was frozen and stored at −80° C. As controls, a sham-operation group of rats administered with a solvent of distilled water, and a group of spinal nerve ligation model rats administered with distilled water (distilled water administration group) were provided, and the rats of both the groups were subjected to the same treatment for collecting the sciatic nerves and then euthanized.

For quantitative determination of actin filaments and actin monomers, G-actin/F-actin in vivo assay kit (manufactured by Cytoskeleton Inc.) was used. The frozen tissues were homogenized with a protease inhibitor and ATP (1 mM)-containing lysis and F-actin stabilization buffer (manufactured by Cytoskeleton Inc.) added thereto. The thus obtained homogenate was incubated at 37° C. for 10 minutes, and the resultant was centrifuged at 350×g for 5 minutes. The resultant supernatant was centrifuged at 100,000×g at 37° C. for 1 hour. A supernatant obtained after the centrifugation was used as an actin monomer sample, and a precipitate was used as an actin filament sample. The actin filament sample was incubated on ice for 1 hour, and pipetted once every 15 minutes. The amount of actin in each of the actin monomer sample and the actin filament sample was measured by Western blotting. Each of the actin monomer sample and the actin filament sample was subjected to heat denaturation treatment with SDS sample buffer added thereto, and the resultant applied on SDS-PAGE precast gel (manufactured by Bio-Rad) for electrophoresis to separate protein. The protein contained in the gel was electrically moved to/fixed in a PVDF membrane to prepare a blot (blotting membrane) (Trans-blot Turbo Blotting System, manufactured by Bio-Rad). After the blotting membrane was blocked (Block One, manufactured by Nacalai Tesque, Inc.), an antibody against actin (anti-actin rabbit polyclonal antibody) was added thereto, followed by incubation at room temperature for 1 hour. After washing the resultant blotting membrane, an anti-rabbit HRP-labeled secondary antibody (manufactured by GE Healthcare) was added thereto, followed by incubation at room temperature for 30 minutes. After washing the resultant blotting membrane, a detection reagent (ECL Prime, manufactured by GE Healthcare) was added thereto to detect chemiluminescence using a CCD Imager (manufactured by Bio-Rad). Luminescence intensity of a band corresponding to actin was quantitatively determined using Image Lab software (manufactured by Bio-Rad).

Evaluation results of the compound of Example 7 on an actin filament/actin monomer ratio in the sciatic nerve of the rat spinal nerve ligation model are illustrated in FIG. 3. FIG. 3a illustrates images, detected by Western blotting, of actin protein present in actin filament samples (upper images) and actin monomer samples (lower images) isolated from the sciatic nerve. The luminescence intensity of each band of the actin protein was quantitatively determined, and a ratio of the actin filaments to the actin monomers (hereinafter, the actin filament/actin monomer ratio) was calculated to be illustrated in FIG. 3b. The vertical axis of FIG. 3b indicates the actin filament/actin monomer ratio (average±standard deviation). "Distilled Water-Sham Operation" on the horizontal axis indicates the sham-operation group (6 samples), "Distilled Water" indicates the distilled water administration group of the spinal nerve ligation model rats (7 samples), "Compound of Example 7" indicates the group of the spinal nerve ligation model rats administered with the compound of Example 7, "6" indicates the group of the spinal nerve ligation model rats administered with the compound of Example 7 at 6 mg/kg (6 samples), "20" indicates the group of the spinal nerve ligation model rats administered with the compound of Example 7 at 20 mg/kg (6 samples), and "60" indicates the group of the spinal nerve ligation model rats administered with the compound of Example 7 at 60 mg/kg (7 samples). In this drawing, "#" indicates that there is a statistically significant difference (#: $p<0.05$, Student's t-test) as compared with the sham-operation group, and "*" indicates that there is a statistically significant difference (*: $p<0.025$, Williams' multiple comparison, one-sided) compared to the distilled water administration group of the spinal nerve ligation model rats.

In the rat spinal nerve ligation model group administered with distilled water (distilled water administration group), the actin filament/actin monomer ratio significantly increased as compared with that in the sham-operation group. In the groups administered with the compound of Example 7, the actin filament/actin monomer ratio was reduced as the dose of the compound of Example 7 was increased, and was significantly reduced in the group administered at 60 mg/kg compared to that in the distilled water administration group. Specifically, it was revealed that the compound of Example 7 has the effect of improving abnormality in regulation of actin filament turnover of the sciatic nerve caused by spinal nerve ligation.

As the function of advillin, that is, one of molecular targets of the cyclic amine derivative (I) or a pharmacologically acceptable salt thereof described in Example 11, a function of regulating actin filament turnover via binding to actin has been reported (Hasegawa et al, The Journal of Neuroscience, 2007, vol. 27, pp. 14404-14414). Accordingly, it was revealed, based on Examples 11, 12 and 13, that the cyclic amine derivative (I) or a pharmacologically acceptable salt thereof has, in addition to an effect of binding to advillin and/or an advillin complex, an effect of promoting the function of advillin and/or an advillin complex to improve abnormality in regulation of actin filament turnover.

Example 14: Evaluation of Effect of Promoting Axon Extension in Primary Cultured Cells of Rat Dorsal Root Ganglion The effect of the cyclic amine derivative (I) or a pharmacologically acceptable salt thereof on neurite extension in primary cultured cells of rat dorsal root ganglion was examined.

Male SD rats (manufactured by Charles River Laboratories Japan, Inc.) of 4 to 7 weeks old were used. Each rat was anesthetized by intraperitoneally administering urethane. After confirming that the rat was anesthetized, the rat was rapidly euthanized by exsanguination from the abdominal aorta. After incision of the dorsal part, the spinal column was excised and cooled on ice. The dorsal side of the spinal column was cut off, and the spinal cord was removed from the ventral side of the spinal column to expose the dorsal root ganglia on the ventral side of the spinal column. The dorsal root ganglia (L3 to 6, right and left) were excised with tweezers, and dipped in ice-cold Leibovitz's L-15 medium (manufactured by Thermo Fisher Scientific), and the bundles of nerve fibers were removed under a stereoscopic microscope. The dorsal root ganglia from which the bundles of nerve fibers had been removed were made fine slits with ophthalmic scissors to be used as dorsal root ganglion pieces.

The dorsal root ganglion pieces were dipped in about 3 mL of a solution of collagenase A (manufactured by Roche Molecular Systems, Inc.), followed by incubation at 37° C. for 20 minutes. After the incubation, the resultant was centrifuged at 200×g at 25° C. for 5 minutes to remove a collagenase A solution corresponding to the supernatant. About 1 mL of a solution of trypsin was added thereto, followed by incubation at 37° C. for 5 minutes. Subsequently, about 3 mL of DMEM (manufactured by Thermo Fisher Scientific K.K.) containing 10% fetal bovine serum was added to the resultant, the resultant centrifuged at 200×g at room temperature for 5 minutes, and then the supernatant removed. After removing the supernatant, about 5 mL of Neurobasal-A Medium (hereinafter, the culture medium, manufactured by Thermo Fisher Scientific K.K.) containing 2% B27 supplement was added to the precipitate, and the precipitate dispersed with a micropipette. A 70 μm cell strainer (manufactured by BD Falcon) was used to collect cells with debris removed, and the debris remaining on the cell strainer washed with 5 mL of the culture medium to collect cells. The thus collected cells were centrifuged at 200×g at room temperature for 5 minutes to remove the supernatant.

After removing the supernatant, 5 mL of the culture medium was added to suspend cell pellets. The thus obtained cell suspension was seeded in a poly-D-lysine-coated 96 well plate (manufactured by BD Biosciences) coated with laminin (6 μg/cm$^2$, manufactured by Sigma Aldrich) by 100 μL to be cultured in a CO$_2$ incubator at 37° C. and 5% CO$_2$.

Two hours after starting the culture, the medium was exchanged with a culture medium containing oxaliplatin (final concentration 3 μM), and the resultant was cultured for 7 days to induce axonal injury. The compound of Example 7 was caused to be contained in the culture medium (final concentration 10, 30 or 100 μM) for treatment at the same time as oxaliplatin.

One week after starting the culture, the resultant cells were washed with PBS(−) three times, and treated with a 4% paraformaldehyde-phosphate buffer for 10 minutes. The resultant was washed with PBS(−) three times, and treated with 20% Blocking One (manufactured by Nacalai Tesque, Inc.) and 0.1% Triton X-100/PBS(−) for 1 hour. After washing with PBS(−) once, the resultant was treated at 4° C. overnight with an anti-βIII tubulin mouse monoclonal antibody (manufactured by Promega Corporation) diluted 500 times with 0.1% Triton X-100/PBS(−) containing 5% Blocking One. After the treatment overnight, the resultant was washed with PBS(−) three times, and treated at room temperature for 1 hour with a secondary antibody (CF488A anti-mouse IgG donkey antibody, manufactured by Biotium) diluted with 0.1% Triton X-100/PBS(−) containing 5% Blocking One. Subsequently, the resultant was washed with PBS(−) three times, treated for 5 minutes with DAPI (manufactured by Dojindo Laboratories) diluted 1000 times with PBS(−), and washed with PBS(−) three times.

An image of the resultant cells was acquired using IN Cell Analyzer 2200 (manufactured by GE Healthcare), and the image analyzed using IN Cell Investigator Developer Toolbox. As the result of the analysis, a value obtained by dividing the length of a region identified as a neurite (Fiber length) by the number of neurons was shown as the length of a neurite per cell, and an effect of increasing the length of a neurite was evaluated as axon extension effect.

FIG. 4 illustrates images of examples of average cells, obtained under respective conditions, of a non-treatment group (treated with distilled water), an oxaliplatin alone treated group, and a group treated with oxaliplatin and 100 μM of the compound of Example 7. As illustrated in FIG. 4, an image in which the length of a neurite was reduced by the treatment with oxaliplatin alone was observed, and we found that the length of a neurite was increased by the treatment with the compound of Example 7 (100 μM) as compared with that in the oxaliplatin alone treated group.

Analysis results of the length of neurites in the respective images are illustrated in FIG. 5. The vertical axis of FIG. 5 indicates the length of a neurite (μm/neuron) (average±standard deviation, each group consisting of 5 samples). "Distilled Water" shown on the horizontal axis indicates the non-treated group, "Oxaliplatin+Distilled Water" indicates the oxaliplatin alone treated group, "Oxaliplatin+Compound of Example 7" indicates the group administered with oxaliplatin and the compound of Example 7, "10" indicates the group treated with oxaliplatin and 10 μM of the compound of Example 7, "30" indicates the group treated with oxaliplatin and 30 μM of the compound of Example 7, and "100" indicates the group treated with oxaliplatin and 100 μM of the compound of Example 7. In this drawing, "#" indicates that there is a statistically significant difference as compared with the non-treated group (#: $p<0.05$, Student's t-test), and "*" indicates that there is a statistically significant difference as compared with the oxaliplatin alone treated group (*: $p<0.025$, Williams' multiple comparison, one-sided).

As illustrated in FIG. 5, while the length of a neurite was significantly reduced by the treatment with oxaliplatin alone, the length of a neurite was found to increase by the treatment with the compound (10, 30 or 100 μM) of Example 7 as the dose of the compound of Example 7 was increased compared to that in the oxaliplatin alone treated group. In the group treated with 100 μM of the compound of Example 7, we found the length significantly increased compared to that in the oxaliplatin alone treated group. In other words, it was revealed that the compound of Example 7 has an effect of promoting axon extension in primary cultured cells of rat dorsal root ganglion having axonal injury induced with oxaliplatin.

As the function of advillin, that is, one of molecular targets of the cyclic amine derivative (I) described in Example 11, a function of extending an axon has been reported (Hasegawa et al, The Journal of Neuroscience, 2007, vol. 27, pp. 14404-14414). Accordingly, it was revealed, based on Examples 11 and 14, that the cyclic amine derivative (I) or a pharmacologically acceptable salt thereof has, in addition to the effect of binding to advillin and/or an advillin complex, an effect of promoting axon extension.

Based on these results, it was revealed that our cyclic amine derivative (I) has the effect of promoting advillin function.

INDUSTRIAL APPLICABILITY

Our cyclic amine derivative or a pharmacologically acceptable salt thereof has the effect of promoting advillin function, and hence can be used as a medicine against a disease related to axonal injury.

All publications, patents and patent applications cited herein are incorporated herein by reference in their entirety.

The invention claimed is:

1. A method of treating axonal injury, comprising administering a therapeutically effective amount of a cyclic amine derivative represented by general formula (I) or a pharmacologically acceptable salt thereof to a patient in need thereof:

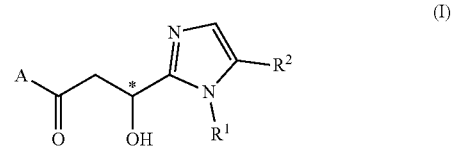

(I)

wherein carbon marked with * represents asymmetric carbon, and A represents a group represented by general formula (IIa) or (IIb):

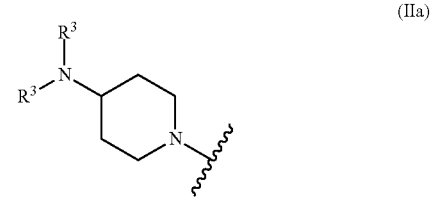

(IIa)

-continued

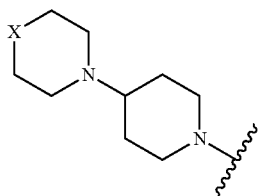
(IIb)

wherein R¹ represents a methyl group, a n-propyl group, an isopropyl group, a 2-methoxyethyl group, a 2-ethoxyethyl group, a difluoromethyl group, or a 3,3,3-trifluoropropyl group, R² represents a hydrogen atom, a fluorine atom, or a chlorine atom, each R³ independently represents a methyl group or an ethyl group, and X represents —O— or —N(R³)—, wherein the axonal injury is caused by at least one disease selected from the group consisting of:

giant cell arteritis, Takayasu arteritis, polyarteritis nodosa, Kawasaki disease, granulomatosis with polyangiitis (Wegener's granulomatosis), microscopic polyangiitis, eosinophilic granulomatosis with polyangiitis (allergic granulomatous angiitis, Churg-Strauss syndrome), cryoglobulinemia, IgA vasculitis (Henoch-Schonlein purpura), cutaneous leukocytoclastic vasculitis, systemic lupus erythematosus, Sjogren's syndrome, rheumatoid arthritis, mixed connective tissue disease, polymyositis, dermatomyositis, scleroderma, Behcet's disease, bacterial/viral infectious diseases, sarcoidosis, and malignant tumors and;

wherein the treating axonal injury comprises promoting axon extension.

2. The method according to claim 1, wherein A is the group represented by general formula (IIa).

3. The method according to claim 1, wherein A is the group represented by general formula (IIb).

4. The method according to claim 3, wherein X is —N(R³)—.

5. The method according to claim 1, wherein R¹ is a methyl group, a n-propyl group, an isopropyl group, a 2-methoxyethyl group, or a 3,3,3-trifluoropropyl group.

6. The method according to claim 1, wherein R² is a hydrogen atom or a chlorine atom.

7. The method according to claim 1, wherein a stereochemical configuration of the asymmetric carbon marked with * is S.

8. The method according to claim 1, wherein the treating axonal injury comprises binding of the cyclic amine derivative represented by general formula (I) or the pharmacologically acceptable salt thereof to advillin and/or an advillin complex.

9. The method according to claim 1, wherein the treating axonal injury comprises improving abnormality in regulation of actin filament turnover.

10. The method according to claim 1, wherein the treating axonal injury comprises improving abnormality in regulation of actin filament turnover and promoting axon extension by binding of the cyclic amine derivative represented by general formula (I) or the pharmacologically acceptable salt thereof to advillin and/or an advillin complex.

11. The method according to claim 1, wherein the bacterial/viral infectious diseases are Lyme disease, HIV infectious disease, or leprosy.

12. A method of treating axonal injury, comprising administering a therapeutically effective amount of a cyclic amine derivative represented by general formula (I) or a pharmacologically acceptable salt thereof to a patient in need thereof:

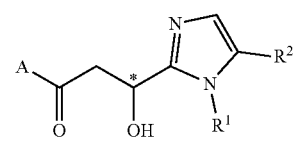
(I)

wherein carbon marked with * represents asymmetric carbon having an S configuration, and A represents a group represented by general formula (IIa):

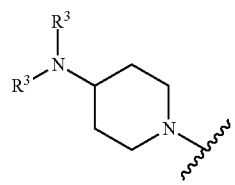
(IIa)

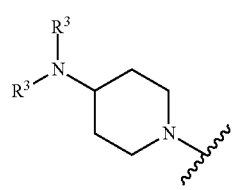
(IIa)

wherein R¹ represents a methyl group, a n-propyl group, an isopropyl group, a 2-methoxyethyl group, or a 3,3,3-trifluoropropyl group, R² represents a hydrogen atom, or a chlorine atom, each R³ independently represents a methyl group or an ethyl group, and X represents —O— or —N(R³)—, wherein the axonal injury is caused by at least one disease selected from the group consisting of: giant cell arteritis, Takayasu arteritis, polyarteritis nodosa, Kawasaki disease, granulomatosis with polyangiitis (Wegener's granulomatosis), microscopic polyangiitis, eosinophilic granulomatosis with polyangiitis (allergic granulomatous angiitis, Churg-Strauss syndrome), cryoglobulinemia, IgA vasculitis (Henoch-Schonlein purpura), cutaneous leukocytoclastic vasculitis, systemic lupus erythematosus, Sjogren's syndrome, rheumatoid arthritis, mixed connective tissue disease, polymyositis, dermatomyositis, scleroderma, Behcet's disease, bacterial/viral infectious diseases, sarcoidosis, and malignant tumors, and wherein the treating axonal injury comprises promoting axon extension.

13. The method of claim 12, wherein cyclic amine derivative represented by general formula (I) is (S)-1-(4-(dimethylamino)piperidin-1-yl)-3-(1-propyl-1H-imidazol-2-yl)-3-hydroxypropan-1-one, (S)-1-(4-(dimethylamino)piperidin-1-yl)-3-(1-isopropyl-1H-imidazol-2-yl)-3-hydroxypropan-1-one, (S)-1-(4-(dimethylamino)piperidin-1-yl)-3-(1-(2-methoxyethyl)-1H-imidazol-2-yl)-3-hydroxypropan-1-one and(S)-1-(4-(dimethylamino)piperidin-1-yl)-3-(1-(3,3,3-trifluoropropyl)-1H-imidazol-2-yl)-3-hydroxypropan-1-one, (S)-1-(4-(dimethylamino)piperidin-1-yl)-3-hydroxy-3-(1-methyl-1H-imidazol-2-yl)propan-1-one and (S)-3-(5-chloro-1-methyl-1H-imidazol-2-yl)-1-(4-(dimethylamino)piperidin-1-yl)-3-hydroxypropan-1-one.

14. A method of treating axonal injury, comprising administering a therapeutically effective amount of a cyclic amine derivative represented by general formula (I) or a pharmacologically acceptable salt thereof to a patient in need thereof:

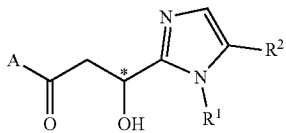
(I)

wherein carbon marked with * represents asymmetric carbon, and A represents a group represented by general formula (IIa) or (IIb):

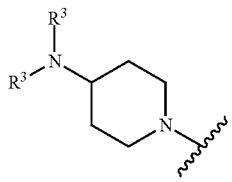
(IIa)

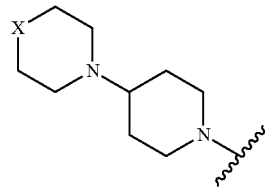
(IIb)

wherein $R^1$ represents a methyl group, a n-propyl group, an isopropyl group, a 2-methoxyethyl group, a 2-ethoxyethyl group, a difluoromethyl group, or a 3,3,3-trifluoropropyl group, $R^2$ represents a hydrogen atom, a fluorine atom, or a chlorine atom, each $R^3$ independently represents a methyl group or an ethyl group, and X represents —O— or —N($R^3$)—, wherein the treating axonal injury comprises promoting axon extension.

15. A cyclic amine derivative that is one compound selected from the group consisting of 3-hydroxy-3-(1-methyl-1H-imidazol-2-yl)-1-(4-morpholinopiperidin-1-yl)propan-1-one, 1-(4-(dimethylamino)piperidin-1-yl)-3-(1-propyl-1H-imidazol-2-yl)-3-hydroxypropan-1-one, 1-(4-(dimethylamino)piperidin-1-yl)-3-(1-isopropyl-1H-imidazol-2-yl)-3-hydroxypropan-1-one, 3-(5-chloro-1-methyl-1H-imidazol-2-yl)-1-(4-(dimethylamino)piperidin-1-yl)-3-hydroxypropan-1-one, 1-(4-(dimethylamino)piperidin-1-yl)-3-(1-(2-methoxyethyl)-1H-imidazol-2-yl)-3-hydroxypropan-1-one and 1-(4-(dimethylamino)piperidin-1-yl)-3-(1-(3,3,3-trifluoropropyl)-1H-imidazol-2-yl)-3-hydroxypropan-1-one, or a pharmacologically acceptable salt thereof.

16. A medicine comprising the cyclic amine derivative or the pharmacologically acceptable salt thereof according to claim 15 as an active ingredient.

* * * * *